(12) United States Patent
Higashiura et al.

(10) Patent No.: US 7,715,030 B2
(45) Date of Patent: May 11, 2010

(54) PRINTING APPARATUS AND PRINT RESTRICTIONS MANAGEMENT SYSTEM FOR INQUIRING WHETHER CHANGING PRINT RESTRICTIONS IS AUTHORIZED

(75) Inventors: Masaki Higashiura, Yamatokoriyama (JP); Yusuke Nagai, Yamatokoriyama (JP); Wataru Nishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1084 days.

(21) Appl. No.: 11/148,063

(22) Filed: Jun. 8, 2005

(65) Prior Publication Data

US 2005/0275868 A1     Dec. 15, 2005

(30) Foreign Application Priority Data

Jun. 10, 2004  (JP)  ............................. 2004-172919

(51) Int. Cl.
   *G06K 15/00*  (2006.01)
(52) U.S. Cl. ..................... 358/1.14; 358/1.15; 399/79
(58) Field of Classification Search ............... 358/1.14, 358/1.15; 705/1; 714/36; 399/79; 235/375; 347/240
   See application file for complete search history.

(56) References Cited

U.S. PATENT DOCUMENTS

| 6,202,092 | B1 * | 3/2001 | Takimoto | 358/1.15 |
| 6,985,244 | B1 * | 1/2006 | Bhogal et al. | 358/1.15 |
| 7,075,666 | B1 * | 7/2006 | Aiyama | 358/1.15 |
| 7,158,946 | B2 * | 1/2007 | Sato et al. | 399/79 |
| 7,249,706 | B2 * | 7/2007 | Naito | 235/375 |
| 7,385,720 | B2 * | 6/2008 | Bhatti | 358/1.15 |
| 2004/0095459 | A1 * | 5/2004 | Russell et al. | 347/240 |
| 2004/0141203 | A1 * | 7/2004 | Honma | 358/1.15 |
| 2004/0199399 | A1 * | 10/2004 | Sugiyama | 705/1 |
| 2004/0246520 | A1 * | 12/2004 | Obert | 358/1.15 |
| 2004/0260978 | A1 * | 12/2004 | Naito | 714/36 |
| 2005/0007618 | A1 * | 1/2005 | Thomason | 358/1.14 |
| 2005/0078332 | A1 * | 4/2005 | Brown | 358/1.15 |

FOREIGN PATENT DOCUMENTS

| JP | 2001-113796 | 4/2001 |
| JP | 2001-188663 | 7/2001 |

(Continued)

*Primary Examiner*—Twyler L Haskins
*Assistant Examiner*—Nicholas C Pachol
(74) *Attorney, Agent, or Firm*—Renner, Otto, Boisselle & Sklar, LLP

(57) ABSTRACT

An upper limit of allowed print count is set for each user requesting print jobs, and a multi function printer includes: (i) a schedule transmission requesting section for acquiring schedule information of the user; (ii) a print count predicting section for predicting, on the basis of the acquired schedule information, allowed print count assigned to the user, and the number of printed sheets, whether changing the upper limit of the allowed print count is required; and (iii) a settings change inquiry section for inquiring a manager terminal of whether the manager terminal authorizes changing the upper limit of the allowed print count. If having obtained from the manager terminal authorization of change of the upper limit of the allowed print count, the multi function printer performs a print job within a range of a new allowed print count.

Thus, the multi function printer can reduce print job costs by setting restrictions concerning print jobs and smoothly process print jobs by appropriately changing the restrictions in advance if necessary.

15 Claims, 11 Drawing Sheets

FOREIGN PATENT DOCUMENTS

| | | |
|---|---|---|
| JP | 2002-082789 | 3/2002 |
| JP | 2002-215373 | 8/2002 |
| JP | 2003-162397 | 6/2003 |
| JP | 2003-195703 | 7/2003 |
| JP | 2004-098505 | 4/2004 |

* cited by examiner

| ACCOUNT INFORMATION | UPPER LIMIT OF ALLOWED PRINT COUNT | THE NUMBER OF PRINTED SHEETS |
|---|---|---|
| USER A | 100 | 20 |
| USER B | 150 | 15 |
| ⋮ | ⋮ | ⋮ |
| GROUP A | 300 | 120 |
| GROUP B | 500 | 200 |
| ⋮ | ⋮ | ⋮ |

FIG. 6

(EXAMPLE) MARCH 1, 2004    45

DOCUMENTS FOR ○○ MEETING

INTRODUCTION

USER A'S SCHEDULES FOR OCTOBER

| MON | TUE | WED | THU | FRI | SAT | SUN |
|---|---|---|---|---|---|---|
| 1 ○◎MEETING :20 COPIES | 2 ×× MEETING :30 COPIES △△MEETING :10 COPIES | 3 | 4 | 5 | 6 | 7 |
| 8 ○◎MEETING :20 COPIES | 9 | 10 ×△MEETING :10 COPIES △△MEETING :10 COPIES ... | 11 | 12 | 13 | 14 |
| 15 ○○MEETING :20 COPIES | 16 | 17 | 18 ○△MEETING :50 COPIES | 19 | 20 | 21 |
| 22 ○○MEETING :20 COPIES | 23 | 24 | 25 ○△MEETING :50 COPIES | 26 | 27 | 28 |
| 29 ○○MEETING :20 COPIES | 30 | 31 ○× MEETING :40 COPIES | | | | |

FIG. 13

USER A'S ALLOWED PRINT COUNT

| FISCAL 2003 |||||||
|---|---|---|---|---|---|---|
| 160000 COPIES |||||||
| JANUARY ||| ... | DECEMBER |||
| 3000 COPIES ||| ... | 5000 COPIES |||
| 1 | ... | 31 | | 1 | ... | 31 |
| 10 COPIES | ... | 45 COPIES | | 78 COPIES | ... | 95 COPIES |

PRINTING APPARATUS AND PRINT RESTRICTIONS MANAGEMENT SYSTEM FOR INQUIRING WHETHER CHANGING PRINT RESTRICTIONS IS AUTHORIZED

This Nonprovisional application claims priority under 35 U.S.C. §119(a) on Patent Application No. 172919/2004 filed in Japan on Jun. 10, 2004, the entire contents of which are hereby incorporated by reference.

FIELD OF THE INVENTION

The present invention relates to a printing apparatus connected to one or more user terminals via a network, a print control program, and a storage medium storing the print control program. Particularly, the present invention relates to a print management unit which judges whether a print restriction is required, and if judging that the print restriction is required, appropriately changes the print restriction to perform a print job.

BACKGROUND OF THE INVENTION

As to printers connected to a communications network, printers performing various kinds of managements regarding print jobs have been conventionally proposed.

For example, a system where a printer is shared by a plurality of users via a communications network enables printing in response to a request for performing a print job from anyone who can connect to this network regardless of whether he/she is an authorized user.

In view of this, in such a system having a printer connected to a communications network, the printer preferably manages whether a person who requests it to perform a print job is an authorized user so that the printer can determine whether to authorize printing of print data.

For example, patent document 1 (Japanese Laid-Open Patent Application No. 215373/2002; Tokukai 2002-215373 (published on Aug. 2, 2002)) discloses an image forming system including the following image forming device: Upon receipt of print data, it obtains print restriction information of a host having transmitted the print data from a restriction address data storage server, using a transmitting-end physical address added to the print data, and determines whether to authorize printing on the basis of the obtained print restriction information.

Patent document 2 (Japanese Laid-Open Patent Application No. 113796/2001; Tokukai 2001-113796 (published on Apr. 24, 2001) discloses the following schedule management server: The server stores, as schedule data, a start time and document information fed from an operating section. Then, the server compares a present time clocked by a clocking section with the start time of the schedule data. When a predetermined time comes, the server transmits the document information via an external I/F (interface) to a printer server provided on a communications network so as to make a printer to perform printing. This arrangement allows for timely printing of documents that are necessary for an event corresponding to schedule data, thus enhancing convenience.

Patent document 3 (Japanese Laid-Open Patent Application No. 162397/2003; Tokukai 2003-162397 (published on Jun. 6, 2003)) discloses a printer system having: (a) a print client unit including a print conditions setting dialog display function, a printing conditions setting function, print data creating function, and print data transfer function; and (b) a printer unit including a data reception, analysis, and storage function, a request job value calculating function, a print history management function, a fee-charging template data management function, and a usage fee management function.

In this printer system, the print client unit sets printing conditions, obtains a remaining budget amount from the printer unit to know whether a value of a request job exceeds the remaining budget amount. If the value of the request job exceeds the remaining budget amount, the print client unit changes the printing conditions and requests the printer unit to perform printing again. If judging that printing will be possible within the remaining budget amount under the changed print conditions, the printer unit performs printing. Thus, this system prevents waste of consumable products and power under an exacting fee-charging management.

However, in the system disclosed in the patent document 1, under the circumstances where print count as print restriction information is set for each host, when actual print count reaches the set print count, even a necessary print job is not allowed to perform. This makes impossible to perform a necessary print job, resulting in interference with work.

Thus, the system disclosed in the patent document 1 has the problem that a necessary printing of print data is impossible since a print job restriction determined on a preset criteria cannot be changed appropriately when the necessity for the change arises.

Further, if a user who requests a print job cannot perform printing of print data due to the set print job restriction, the user must explain a manager the necessity for printing of the print data to request and obtain a authorization to change setting of the restriction from the manager. This causes the problem that printing efficiency decreases.

The schedule management server disclosed in the patent document 2 performs a print job corresponding to a schedule, and independently performs printing for an unscheduled print job. That is, a print job restriction is not set, which causes the problem that reduction in print job costs cannot be realized.

The printer system disclosed in the patent document 3 sets a budget for print jobs in advance and enables cost adjustment by limiting the print job costs within the budget. However, a print job that does not stay within the budget is handled with change of print job settings, demand for increase of budget limit to the manager, or other coping way.

Changing the settings to stay a print job within the budget changes a setting necessary for print jobs, which does not allow a necessary print job to be performed sufficiently. Demanding increase of budget limit to the manager to perform a print job is not proper because an urgent print job cannot be performed depending upon a status of the manager, for example, when the manager is absent.

In this printer system, a budget limit is increased only by demanding the increase to the manager, so that the manager cannot properly judge whether the print job for which increase of a budget limit is demanded is a necessary print job. Therefore, increase of a budget limit for an unnecessary print job can be demanded to the manager. This causes the problem that reduction in print job costs cannot be realized.

SUMMARY OF THE INVENTION

The present invention has been attained in view of the above problems, and an object thereof is to realize a printing apparatus, a print control program, and a storage medium storing the print control program, all of which reduces print job costs by setting print job restrictions (print restrictions), and smoothly processes print jobs by appropriately changing the print restrictions in advance if necessary.

In order to achieve the above object, a printing apparatus according to the present invention is a printing apparatus in which print restrictions concerning print jobs are set for each user requesting the print jobs, said printing apparatus being communicably connected to a manager terminal operated by a manager authorized to set the print restrictions, the printing apparatus comprising: (i) a print restrictions management information acquiring section for acquiring print restrictions management information indicative of correspondences between the print restrictions assigned to a user and information concerning print jobs of the user; (ii) a settings change predicting section for predicting whether changing the print restrictions set to the user is required, in accordance with the print restrictions management information acquired by the print restrictions management information acquiring section; and (iii) a change authorization confirming section for transmitting change authorization confirming information to the manager terminal if the settings change predicting section has predicted that changing the print restrictions is required, the change authorization confirming information being indicative of inquiry about whether the manager terminal authorizes changing the print restrictions.

Further, in order to achieve the above object, a print restrictions management system according to the present invention is a print restrictions management system in which print restrictions concerning print jobs are set for each user requesting the print jobs, and a manager terminal used by a manager authorized to set the print restrictions is communicably connected to a printing apparatus performing print jobs, the print restrictions management system comprising: (i) a print restrictions management information storage device for storing print restrictions management information indicative of correspondences between the print restrictions assigned to a user and information concerning print jobs of the user; (ii) a print restrictions management information acquiring section for acquiring the print restrictions management information from the print restrictions management information storage device; (iii) a settings change predicting section for predicting whether changing the print restrictions set to the user is required, in accordance with the print restrictions management information acquired by the print restrictions management information acquiring section; and (iv) a change authorization confirming section for outputting change authorization confirming information to the manager terminal if the settings change predicting section has predicted that changing the print restrictions is required, and confirming change authorization information supplied from the manager terminal, the change authorization confirming information being indicative of inquiry about whether the manager terminal authorizes changing the print restrictions, the change authorization information being indicative of whether the manager terminal authorizes changing the print restrictions.

Therefore, a printing apparatus and a print restrictions management system according to the present invention bring the effect of reducing print job costs by setting print job restrictions (print restrictions), and efficiently processing print jobs by appropriately changing the print restrictions in advance if necessary.

The following description will sufficiently clarify further objects, characteristics, and excellent points of the present invention. Further, advantages of the invention will be clarified with reference to the ensuing detailed description taken in conjunction with the accompanying drawings.

BRIEF DESCRIPTION OF THE DRAWINGS

FIG. 6 is a diagram illustrating an example of displayed content of print data related to schedules of the schedule file according to one embodiment of the present invention.

FIG. 8 is a diagram illustrating an exemplary schedule information sent from the schedule management server according to one embodiment of the present invention to the multi function printer.

FIG. 13 is a diagram illustrating an exemplary manner in which the allowed print count of a user is set in a print management system according to one embodiment of the present invention.

DESCRIPTION OF THE EMBODIMENTS

The following will describe one embodiment of the present invention with reference to FIGS. 1 through 13.

Figures 2, 3:
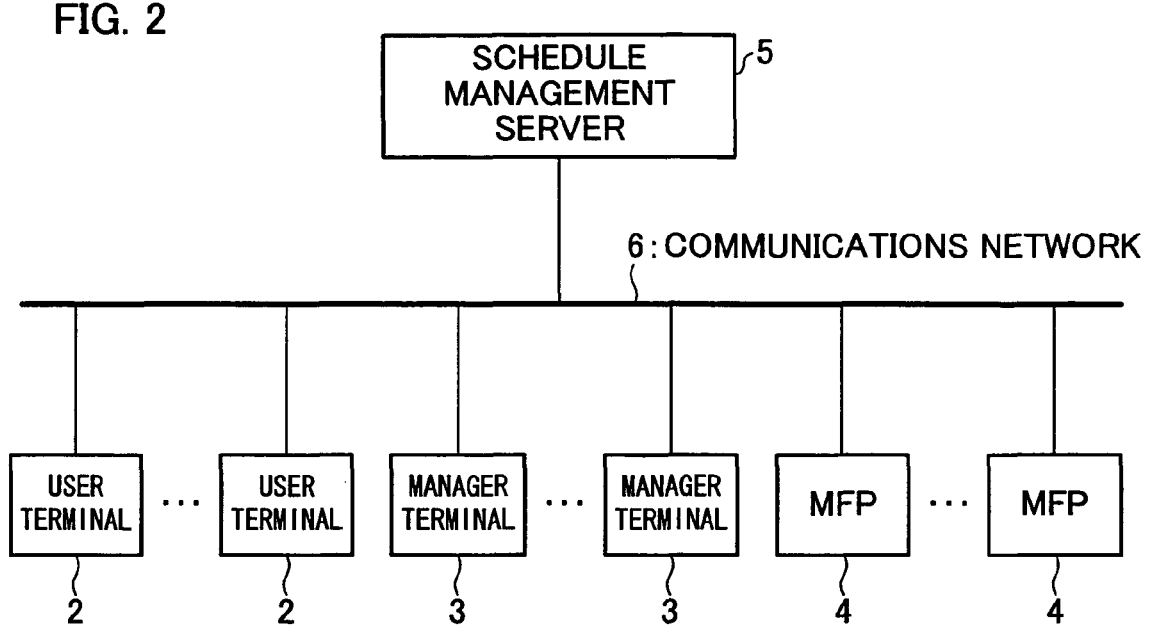
FIG. 2 is a diagram schematically illustrating an exemplary structure of a print management system according to one embodiment of the present invention.
FIG. 3 is a diagram illustrating exemplary print conditions set to a user, held by the multi function printer, in the print management system according to one embodiment of the present invention.

Referring to FIG. 2, the following will describe a schematic structure of a print management system (print restrictions management system) 1 according to the present invention. It should be noted here that FIG. 2 merely schematizes an exemplary structure of the print management system 1.

As shown in FIG. 2, the print management system 1 includes one or more user terminals 2, one or more manager terminals 3, one or more multi function printers (MFP) 4, and a schedule management server (print restrictions management information storage device) 5, which are communicably connected to one another via a communications network 6. Note that, in this print management system 1, an upper limit of the number of print sheets that are processable within a predetermined time period (allowed print count) in the multi function printer 4 is allocated to each user.

The user terminals 2 create print data 45 according to user instructions, and send the print data 45 to the multi function printers 4 to request a print job.

Note that, to each of the users who operate the user terminals 2, account information for specifying himself or herself is allocated. In making a print job request from the user terminals 2 to the multi function printers 4, the user terminals 2 send this account information as well as the print data 45.

The manager terminals 3 are used by managers who make management and settings on print jobs of users in the print management system 1.

Note that, the managers are authorized to set an upper limit of the allowed print count or to approve change of the set upper limit, with respect to each user who instructs the multi function printer 4 to make a print job. In an analogy with corporate organization, the managers are equivalent of management staff.

The manager terminals 3 set an upper limit of allowed print count to each user or each group, so as to stay within an amount budgeted for the print jobs.

Note that, this upper limit is allocated by the managers so as to stay within the limits of a budget, with reference to what work contents each user or each group is involved in and how many numbers of sheets each user or each group used in the past.

The allowed print count allocated to each user or each group is the number of sheets that each user or each group is allowed to print within a predetermined time period. For example, as shown in FIG. 13, the allowed print count may be set to each user on a fiscal year basis, month basis, or day basis. FIG. 13 shows an exemplary manner in which the allowed print count of a user is set in the print management system 1 according to the present embodiment.

The manager terminals 3 hold the set upper limit of allowed print count of each user in their own storages and notify it to the multi function printer 4. Moreover, the manager terminals 3 are arranged so as to receive, from the multi function printer 4, information on how many numbers of sheets were printed (the number of sheets printed) for each user and hold it.

A plurality of manager terminals 3 are provided in the print management system 1 of FIG. 2. However, the present invention is not just limited to this example, and only one manager terminal 3 may be provided.

As compared with the arrangement in which a plurality of manager terminals 3 are provided, the arrangement in which the manager terminal 3 is solely provided is more advantageous in the following point: For example, in a case when other device provided on the same network, such as the multi function printer 4 and user terminal 2, requests the manager terminal 3 to approve a setting change, a destination of the request can be more readily identifiable.

On the contrary, in the print management system 1, the arrangement in which a plurality of manager terminals 3 are provided is advantageous in the following point: A plurality of the foregoing requests made simultaneously to the manager terminals 3 can be divided and processed by the manager terminals 3. Thus, provision of a plurality of manager terminals 3 improves the efficiency of processing the requests.

Note that, the user terminal 2 and the manager terminal 3 have a structure found in common computers. Namely, these terminals include a processing unit (CPU: central processing unit), a memory unit, and an interface unit serving as an external interface. Various operations of the user terminal 2 and the manager terminal 3 are performed by causing the processing unit to run a program stored in the memory unit.

The memory unit can be realized by non-volatile memory, for example, such as a flash EEPROM (Electronically Erasable Programmable Read Only Memory), or a hard disk.

Each of the user terminal 2 and the manager terminal 3, which is provided with an input/output section, receives input from users or managers through an input section and display content of input instructions to users or managers through an output section.

Examples of the input section include a keyboard, numeric keys, a cursor key, a mouse or other types of pointing devices, and a touch panel. Examples of the output section include various types of displays such as an LCD (Liquid Crystal Display).

The multi function printers 4 are multi functional with the function of, for example, carrying out a print job based on the print data 45 sent from the user terminals 2 or read out in the multi function printers 4, or printing out data entered at an external facsimile apparatus (not shown) and transmitted through the communications network 6 or a phone line (not shown). As to a structure of the multi function printers 4, details will be described later.

The communications network 6 constitutes a communication path between the user terminals 2, the manager terminals 3, the multi function printers 4, and the schedule management server 5. Known communications networks can be used as the communications network 6, including, for example, the Internet, LAN (Local Area Network), and designated lines.

The schedule management server 5 manages the schedule of each of the users using the user terminals 2 in the print management system 1 of the present embodiment, or schedule information (print restrictions management information) of a predetermined group made up of some users. Note that, unless otherwise specified herein, both users and groups are referred to as users who use the multi function printers 4.

The schedule management server 5 sends schedule information it manages to the user terminals 2, the manager terminals 3, and the multi function printers 4 in response to requests independently made by these devices, so that the users can check the schedules at the user terminals 2, the manager terminals 3, and the multi function printers 4.

The schedule information is information containing an intended purpose of a print job for each user or each group and an intended number of sheets to be printed for this purpose. As schedule information of a print-job-completed item, the number of print sheets used for an actual print job is recorded. Further, when an unscheduled print job is performed, the number of printed sheets used for this unscheduled print job is recorded. As to the schedule information, details will be described later.

Note that, despite that the print management system 1 according to the present embodiment includes a sole schedule management server 5, a plurality of schedule management servers 5 may be provided as well. For example, in an environment where schedules are often managed on a department basis in an organization, it is preferable that the schedule management server 5 be provided for each department, and that the schedule management servers 5 be configured to exchange information so that the schedule information can be shared between the schedule management servers 5.

Further, the schedule management servers 5 may be adapted to include not only schedule information of the department they manage but also all schedule information including schedule information of other departments.

Providing the schedule management server 5 for each department is advantageous because schedules can be directly grasped in each department.

Further, in a print management system 1 provided with a plurality of schedule management servers 5, the schedule management servers 5 can spread the task that responds to a schedule transmission request or others. Accordingly, there will be no overaccess to a particular schedule management server 5.

Further, the schedule management server 5 may be provided to serve as a back-up server for stored data in the other schedule management servers 5. In this case, malfunction, broken data, or other failure in one of the schedule management servers 5 can be backed up by other schedule management servers 5.

In the print management system 1 according to the present embodiment, each user has an allocated upper limit of print count within a predetermined time period, as described above. Thus, in the print management system 1, there is a limit in the number of unnecessary print jobs carried out by each user or each group. This saves running cost and resources such as print sheet or toner.

Note that, the allocation of the allowed print count in the multi function printer 4 can be made not only on a user basis but also according to how the multi function printers 4 are used. For example, the allocation can be made based on units of departments made up of plural users.

The predetermined time period may be, for example, a year, a half year, or three month. This predetermined time period is preferably determined according to a budgetary period.

The following will describe detailed structures of the multi function printers 4 and the schedule management server in the print management system 1 according to the present embodiment.

(Structure of Multi Function Printer)

Figure 1:
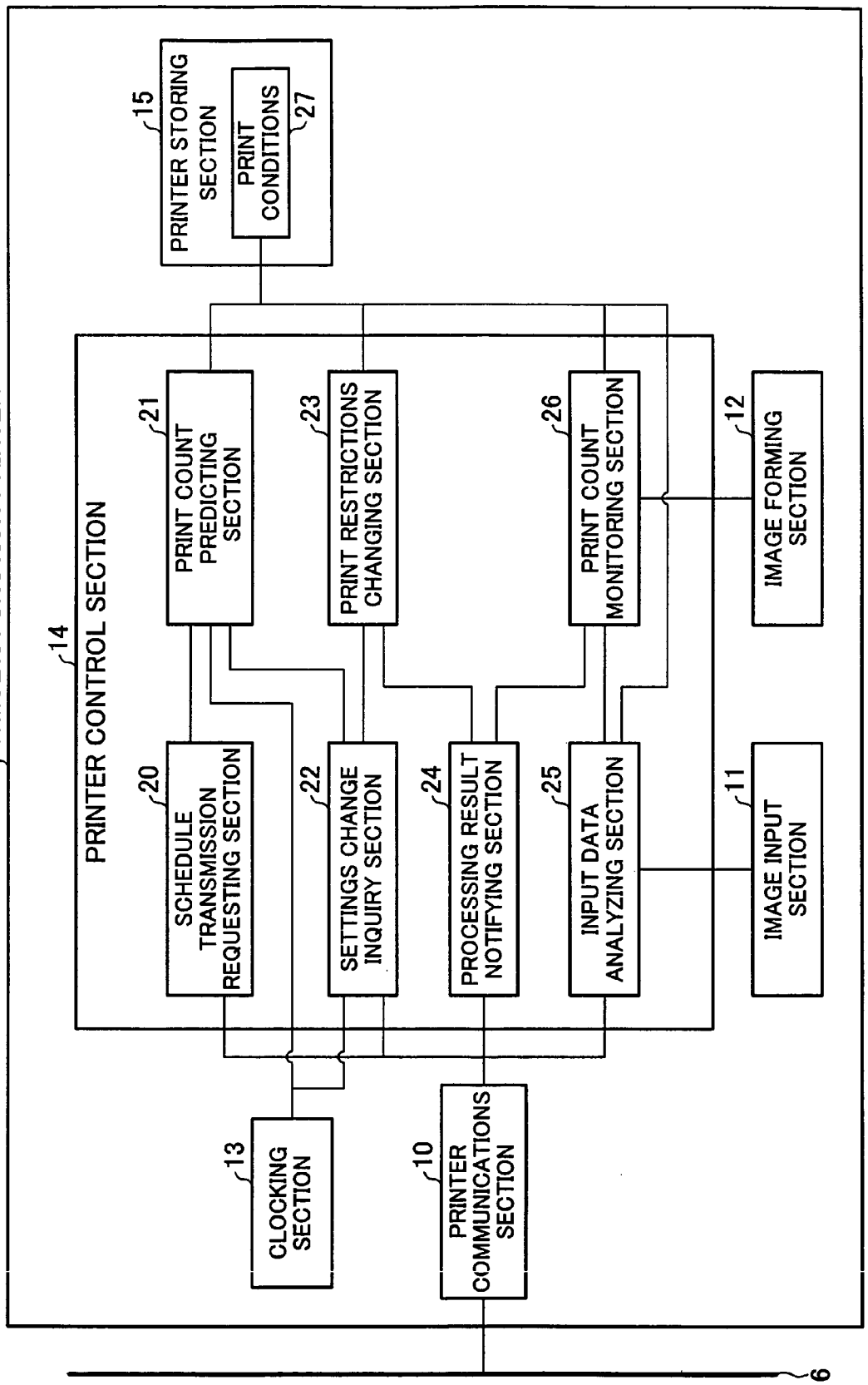
FIG. 1 is a block diagram schematically illustrating an exemplary structure of a multi function printer according to one embodiment of the present invention.

Referring to FIG. 1, the following will describe a detailed structure of the multi function printer 4. FIG. 1 schematizes an exemplary structure of the multi function printer 4.

As shown in FIG. 1, the multi function printer 4 includes a printer communications section 10, an image input section 11, an image forming section 12, a clocking section (response time setting section) 13, a printer control section 14, and a printer storing section 15.

The image input section 11 is provided to obtain image in the form of print data 45, in order to copy the image for example. As used herein, the "image" includes figures, photographs, pictures, and characters.

In order that users copy image, the users can provide instructions on print jobs of the print data 45 read by the image input section 11, using an input section (not shown). Examples of the input section include a keyboard, numeric keys, a cursor key, a mouse or other types of pointing devices, and a touch panel.

The printer communications section 10 enables information to be sent and received to and from the user terminal 2, the manager terminal 3, and the schedule management server 5 via the communications network 6.

Specifically, the printer communications section 10 sends a request for changing an upper limit of print count allocated to a user, to the manager terminal 3 according to instructions sent from the printer control section 14, or receives a reply to the request from the manager terminal 3.

The printer communications section 10 receives the print data 45 transmitted from the user terminal 2, or receives a schedule transmitted from the schedule management server 5.

The image forming section 12 serves to print out an image on a print sheet according to print data 45 received through the printer communications section 10 or read by the image input section 11. The printed sheet in the image forming section 12 is sent to a sheet ejection opening (not shown) and ejected therethrough.

The clocking section 13 is a timer which instructs the multi function printer 4 at regular time intervals to make a judgment whether a request for changing an upper limit of allowed print count set to a user is to be sent. Further, the clocking section 13 manages a waiting time of waiting a reply, from the manager terminals 3, to the request for changing an upper limit of print count, which has been made via the printer communications section 10 to the manager terminal 3.

Specifically, the multi function printer 4 is set so that, in requesting the manager terminal 3 to change the upper limit of allowed print count allocated to a user, no change of the upper limit is carried out when the manager terminal 3 does not send a reply within a predetermined time period.

Further, the multi function printer 4 is set so as to predict whether future print jobs will cause an excess over an upper limit of allowed print count allocated to a user within a predetermined time period.

Further, in the print management system 1, the clocking section 13 can suitably set the waiting time of a reply from the manager terminal 3 or the period during which it is predicted whether future print jobs will cause an excess over the upper limit of allowed print count allocated to a user.

The waiting time of a reply from the manager terminal 3 can be set for each manager terminal 3, taking into account activities of managers operating the manager terminals 3.

The printer storing section 15 can be realized by non-volatile memory, for example, such as flash EEPROM (Electrically Erasable Programmable Read Only Memory), or a hard disk. The printer storing section 15 stores print conditions 27 (print restriction, print restriction information).

The print conditions 27, as shown in FIG. 3 for example, constitute relational information including (i) account information for specifying a user or group requesting a print job, (ii) an upper limit of allowed print count allocated to the user or group, and (iii) print count history on the number of printed sheets. Note that, FIG. 3 shows exemplary print conditions 27 set to a user, held by the multi function printer, in the print management system 1 according to the present embodiment.

The printer control section 14 serves to control various parts of the multi function printers 4. The printer control section 14 includes various functional blocks, including a schedule transmission requesting section (print restrictions management information acquiring section) 20, a print count predicting section (settings change predicting section) 21, a settings change inquiry section (change authorization confirming section) 22, a print restriction changing section 23, a processing result notifying section 24, an input data analyzing section 25, and a print count monitoring section 26.

These functional blocks can be realized, for example, by causing a CPU to run a program stored in a ROM (Read Only Memory) (not shown), by reading it from a RAM (Random Access Memory) (not shown).

The input data analyzing section 25 obtains and analyzes the print data 45 read by the image input section 11 or the print data 45 transmitted via the printer communications section 10 from the user terminals 2.

Specifically, the input data analyzing section 25 receives user's account information, which has been transmitted from the user terminals 2 or entered by the user operating the input section of the multi function printer 4, and analyzes whether the user concerned is an authorized user registered in the print conditions 27. Then, as a result of analysis of the account information, when it is confirmed that the user concerned is an authorized user, the input data analyzing section 25 instructs the print count monitoring section 26 to check a remaining allowed print count of the allowed print count allocated to the user.

Meanwhile, the input data analyzing section 25, when having confirmed that the user requesting a print job is an authorized user, sends the obtained print data 45 to the print count monitoring section 26 and instructs the print count monitoring section 26 to perform a print job.

The print count monitoring section 26 monitors on whether the print count exceeds the upper limit of allowed print count allocated to a user during a print job performed in accordance with the print data 45.

That is, the print count monitoring section 26 checks a remaining allowed print count associated with user's account information fed from the input data analyzing section 25, so as to monitor so that no excess over the remaining allowed print count occurs during a print job performed in accordance with inputted print data.

Note that, when no remaining allowed print count occurs in a print job, the print count monitoring section 26 stops processing the print job. Upon completion of the print job, the print conditions 27 are updated so that information on the number of sheets used in this print job (the number of printed copies) is reflected to the print conditions 27.

Meanwhile, the print count monitoring section 26 outputs this information on the number of sheets used to the processing result notifying section 24 and instructs the processing result notifying section 24 to notify the information to the schedule management server 5.

The processing result notifying section 24 sends, to the schedule management server 5, information on the number of sheets used in the print job, fed from the print count monitoring section 26. Note that, if a request for performing a print job has been made by the user terminal 2, the processing result notifying section 24 sends, to the schedule management server 5 and/or the user terminal 2, information on the number of sheets used in this print job.

Further, the processing result notifying section 24, when an upper limit of the number of print sheets that are processable has been changed, receives information on a new upper limit from the print restriction changing section 23, and then sends the information to the schedule management server 5 via the printer communications section 10.

The print count predicting section 21 predicts whether future print jobs will cause an excess over an upper limit of allowed print count allocated to a user. This prediction is automatically performed in a cycle of a predetermined time period.

That is, the print count predicting section 21, upon receipt of a notification that a predetermined time period has elapsed from the clocking section 13, instructs the schedule transmission requesting section 20 to acquire user's schedule information from the schedule management server 5. Then, the print count predicting section 21 refers to schedule information acquired via the schedule transmission requesting section 20 to check a print count required for print jobs scheduled in the future. Meanwhile, the print count predicting section 21 refers to the print conditions 27 to check a remaining allowed print count of the allowed print count allocated to a user.

Then, the print count predicting section 21 compares between the print count required for the scheduled print jobs and the remaining allowed print count, so as to predict whether future print jobs will cause an excess over the upper limit of allowed print count.

Note that, the prediction by the print count predicting section 21 is performed, as described above, according to (i) the upper limit of allowed print count allocated to a user, (ii) the number of printed sheets, and (iii) the print count required for print jobs scheduled in the future. However, this is not the only possible manner of the prediction.

For example, on the assumption that the schedule information contains only a printed sheet count history, it is possible to estimate a print count available for future unscheduled print jobs on the basis of hours or days that elapse from the present time to an expiry date and time of the upper limit of allowed print count, with reference to this history.

In addition, the print count predicting section 21 may be arranged so as to predict whether future print jobs will cause an excess over the upper limit of allowed print count set in a predetermined time period, on the basis of (i) the upper limit of allowed print count, (ii) the number of printed sheets, (iii) the print count required for print jobs scheduled in the future, and (iv) the print count available for the future unscheduled print jobs.

The print count predicting section 21, when having determined as a result of the prediction that future print jobs will cause an excess over the upper limit of allowed print count, instructs the setting change inquiry section 22 to make a request for changing the upper limit of allowed print count to the manager terminal 3.

The settings change inquiry section 22, in response to the instruction from the print count predicting section 21, requests the manager terminal 3 to change the upper limit of allowed print count of a user.

The settings change inquiry section 22, upon receipt of a reply to the request from the manager terminal 3, analyzes this reply. As a result of the analysis, if the reply is indicative of authorizing change of the upper limit of allowed print count, the settings change inquiry section 22 instructs the print restriction changing section 23 to change the upper limit of allowed print count in the print conditions 27.

The print restriction changing section 23, in response to the instruction from the settings change inquiry section 22, changes the upper limit of allowed print count of a user, recorded in the print conditions 27. More specifically, when the manager terminal 3 authorizes changing the upper limit of allowed print count, it performs, to the multi function printer 4, (a) notification of authorization of the change and (b) transmission of user account information and a new upper limit of allowed print count.

The print restriction changing section 23 identifies, from the account information having been received from the manager terminal 3, a user of which the upper limit of allowed print count is to be changed, and then changes the upper limit of allowed print count allocated to this user.

(Structure of Schedule Management Server)

Figure 4:
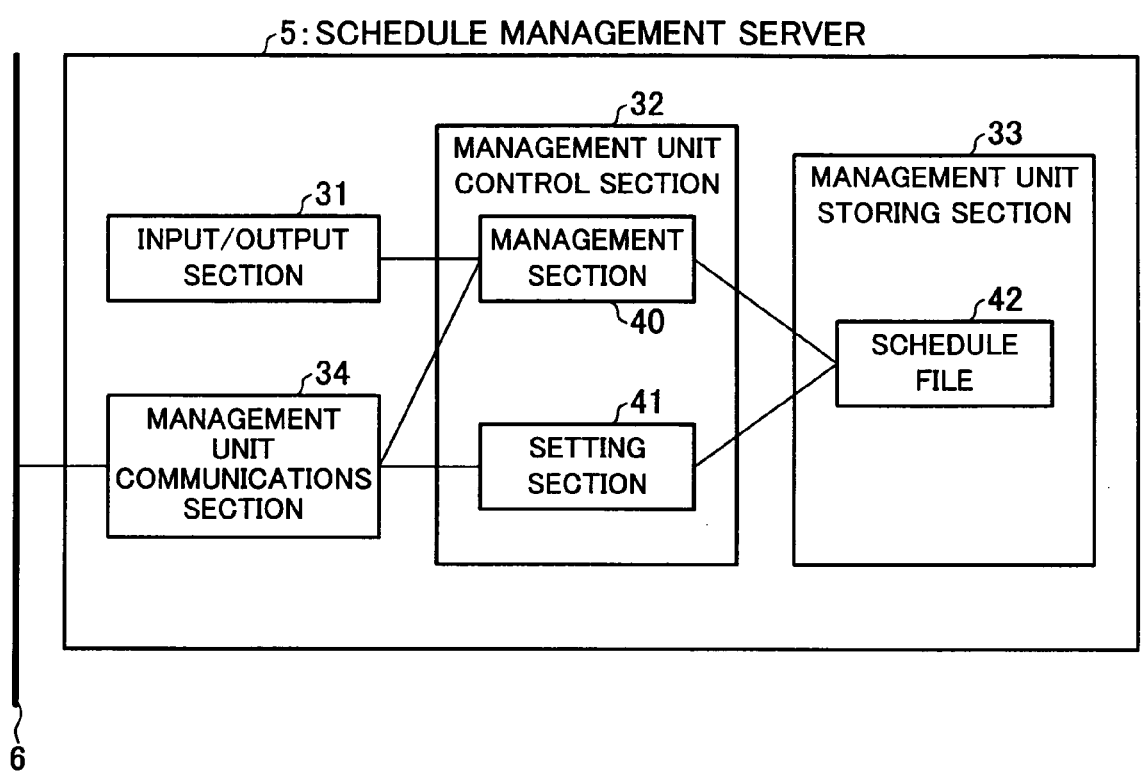
FIG. 4 is a diagram schematically illustrating an exemplary structure of a schedule management server according to one embodiment of the present invention.

Referring to FIG. 4, the following will describe a detailed structure of the schedule management server 5. FIG. 4 schematizes an exemplary structure of the schedule management server 5 according to the present embodiment.

The schedule management server 5 serves to manage schedule information of respective users or groups, such as departments or project teams, in the print management system 1. As shown in FIG. 4, the schedule management server 5 includes an input/output section 31, a management unit control section 32, a management unit storing section 33, and a management unit communications section 34.

The input/output section 31 includes an input section (not shown) and an output section (not shown). The input/output section 31 inputs schedule information or displays image indicative of created schedule information so as to create schedule information in initial settings. Further, the input/output section 31 selects a required schedule information from among pieces of schedule information created, or provides an instruction of transmitting schedule information through the management unit communications section 34 to other device communicably connected via the communications network 6. Note that this instruction from the input/output section 31 is transmitted to the management unit control section 32.

Examples of the input section include a key board, numeric keys, a cursor key, a mouse or other pointing devices, and a touch panel. Examples of the output section include various types of displays such as an LCD (Liquid Crystal Display).

Note that, entry of schedule information is restricted by a preset password, so that only managers, for example, can make the entry. Alternatively, the schedule management server 5 stores account information of operators (managers) who are allowed to enter schedules, so that only specific operators with the account information can enter schedule information.

The management unit communications section 34 enables various data to be sent and received to and from the user terminals 2 and the multi function printers 4 via the communications network 6. Namely, the management unit communications section 34 converts the transmitted data into suitable form and sends it through the communications network 6. In receiving data, the management unit communications section 34 converts the data into suitable form for internal processing, and sends it to the management unit control section 32. The management unit communications section 34 can be realized by a modem, a terminal adapter, or a network adaptor, for example.

The management unit storing section 33 serves to store various kinds of information, and is realized by a semiconductor memory or hard disk, for example. In the schedule management server 5 of the present embodiment, the management unit storing section 33 stores schedule file 42. The schedule file and schedule information will be described later in detail.

The management unit control section 32 serves to control various elements of the schedule management server 5 altogether. The management unit control section 32 includes the management section 40 and a setting section 41 as functional blocks. These functional blocks can be realized, for example, by causing a CPU to run a program stored in a ROM (Read Only Memory) (not shown) or the like, by reading it from a RAM (Random Access Memory) (not shown).

The management section 40, upon receipt of schedule information of users, confirms whether the user who has entered schedule information is an authorized user. The management section 40, if confirming that the entry is made by an authorized user, instructs the setting section 41 to store the entered schedule information into the management unit storing section 33.

Note that, the judgment as to whether the entry is made by an authorized user is made in the following manner.

First, the schedule management server 5 is set so that the user who enters this schedule information through the input/output section 31 needs to enter his/her account information and/or password.

In the schedule management server 5, the management unit storing section 33 stores (a) check information (not shown) used to check validity of entered passwords and/or (b) authorized users' account check information (not shown).

Upon entry of schedule information, the management section 40 refers to the check information and/or account check information to check validity of entered account information and/or password for judgment as to whether the entry of schedule information is made by an authorized user.

The management section 40, upon receipt of a schedule information transmission request transmitted via the management unit communications section 34, confirms a transmission end of the request, selects a requested schedule information from the schedule file 42, and transmits it to the transmission end of the request.

The setting section 41, when an authorized user has entered schedule information and other information, writes the entered schedule information into the schedule file 42 according to an instruction from the management section 40.

Further, the setting section 41, when the multi function printer 4 has performed a print job according to an instruction from a user, writes the number of print sheets used during this print job into a schedule of this user.

That is, the setting section 41, upon receipt of a print job completion notification and information on the number of print sheets used during the print job from the multi function printer 4, writes the received information on the number of print sheets used during the print job into a schedule of the user.

Note that, the authorized user is authorized to enter schedule information in the schedule management server 5 according to the present embodiment. In the print management system 1 according to the present embodiment, the authorized user is only a manager of the manager terminal 3.

(Schedule File and Schedule Information)

Figure 5:
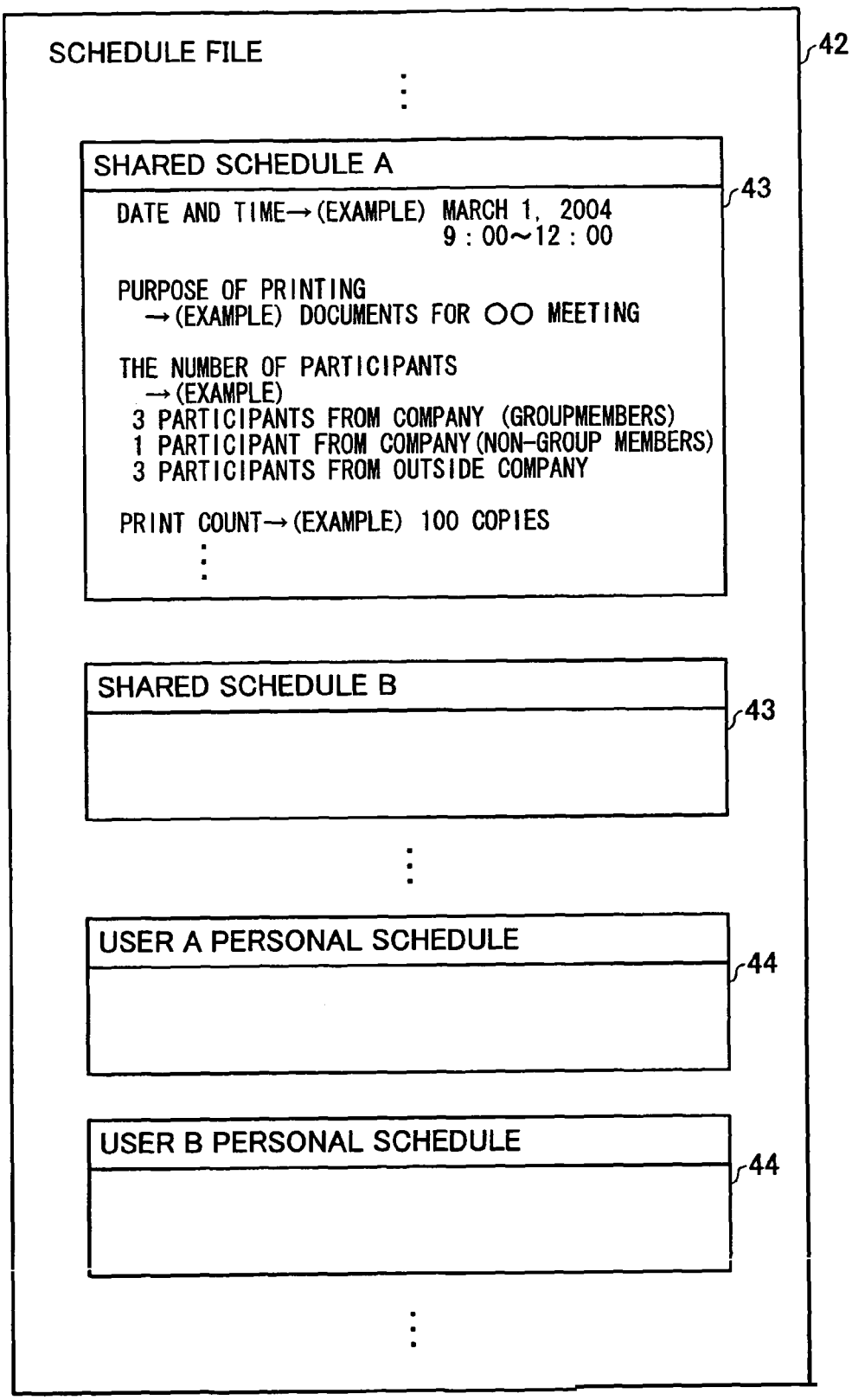
FIG. 5 is a diagram illustrating an example of a schedule file according to one embodiment of the present invention.

Referring to FIG. 5, the following will describe the schedule file 42 stored in the management unit storing section 33 and schedule information recorded in the schedule file 42. FIG. 5 illustrates an exemplary schedule file 42 according to the present embodiment.

As shown in FIG. 5, the schedule file 42 includes schedule information being managed for each entity in which the print count in the print management system 1 is managed. For example, the schedule information include shared schedules 43 (shared schedule A, shared schedule B, . . . ), and user personal schedules 44 (user A personal schedule A, user B personal schedule, . . . ).

The shared schedules refer to schedule information of groups, such as departments or project teams, each being made up of plural users. The user personal schedules refer to schedule information of individual users using the multi function printers 4 for print jobs.

The schedule file 42 manages two types of schedule information: the shared schedules 43 and the user personal schedules 44. However, this is not only the possibility. For example, the schedule file 42 may further include schedule information grouped according to the importance of the schedules in the working environment. Alternatively, the user personal schedules 44 or the shared schedules 43 may be broken up according to the importance of the schedules in the working environment.

The shared schedules 43 and the user personal schedules 44 are related to account information for specifying groups such as departments or project teams, or account information for specifying individual users. This enables the schedule management server 5 to select from the schedule file 42 schedule information based on the account information it receives.

Further, in the print management system 1 according to the present embodiment, as to the shared schedules 43, account information related to the shared schedules 43 is set. Alternatively, users allowed to use the schedule information may be determined in advance so that the shared schedules 43 can be used only by the account information of these users.

It should be noted that in this case, a user is allowed to use the user personal schedule 44 and the shared schedule 43 with one and the same account information, so that the user needs to select either the user personal schedule 44 or the shared schedule 43 before a print job.

The contents of information stored as the shared schedules 43 and the user personal schedules 44 are stored in relation to information such as date and time of a print job, purpose of printing, and a required print count, as shown in FIG. 6. FIG. 6 shows an exemplary displayed content of print data related to schedule information.

Note that, the shared schedules 43 are stored with additional relational information, for example, such as the number of participants in a meeting.

With the schedule information stored in relation to information such as date and time, purpose of printing, a required print count, and the number of participants, one can grasp from this schedule information when the print job will be made in what number and for what purpose.

Further, the shared schedules 43 or the user personal schedules 44 are related to the print data 45. For example, the schedule content of shared schedule A is related to the print data 45 shown in FIG. 5.

The schedule content and the print data 45 can be related to each other by relating header information of the print data 45 to the schedule content.

It should be noted however that the print data 45 can be related to the schedule content only when the print data 45 is in the form of electronic data sent from the user terminals 2. As such, the print data 45 cannot be related to the schedule content when it is obtained from a print sheet by being read out with the image input section 11 as in copying.

Further, as described later, the number of printed sheets used in a print job actually carried out for the purpose recorded in the schedule information is written in the shared schedules 43 and the user personal schedules 44.

Thus, in the multi function printers 4 of the present embodiment, the difference between scheduled print count and actual print count can be known from the history of past schedules.

Thus, in setting an upper limit of allowed print count for each user or group, based on schedule information history, the upper limit of allowed print count can be suitably allocated to each user or group. Moreover, based on schedule information history, budgeting can be made considering a print count expected to need in the predetermined time period.

(Process for Requesting Change of an Upper Limit of Allowed Print Count of a Multi Function Printer)

Figure 7:
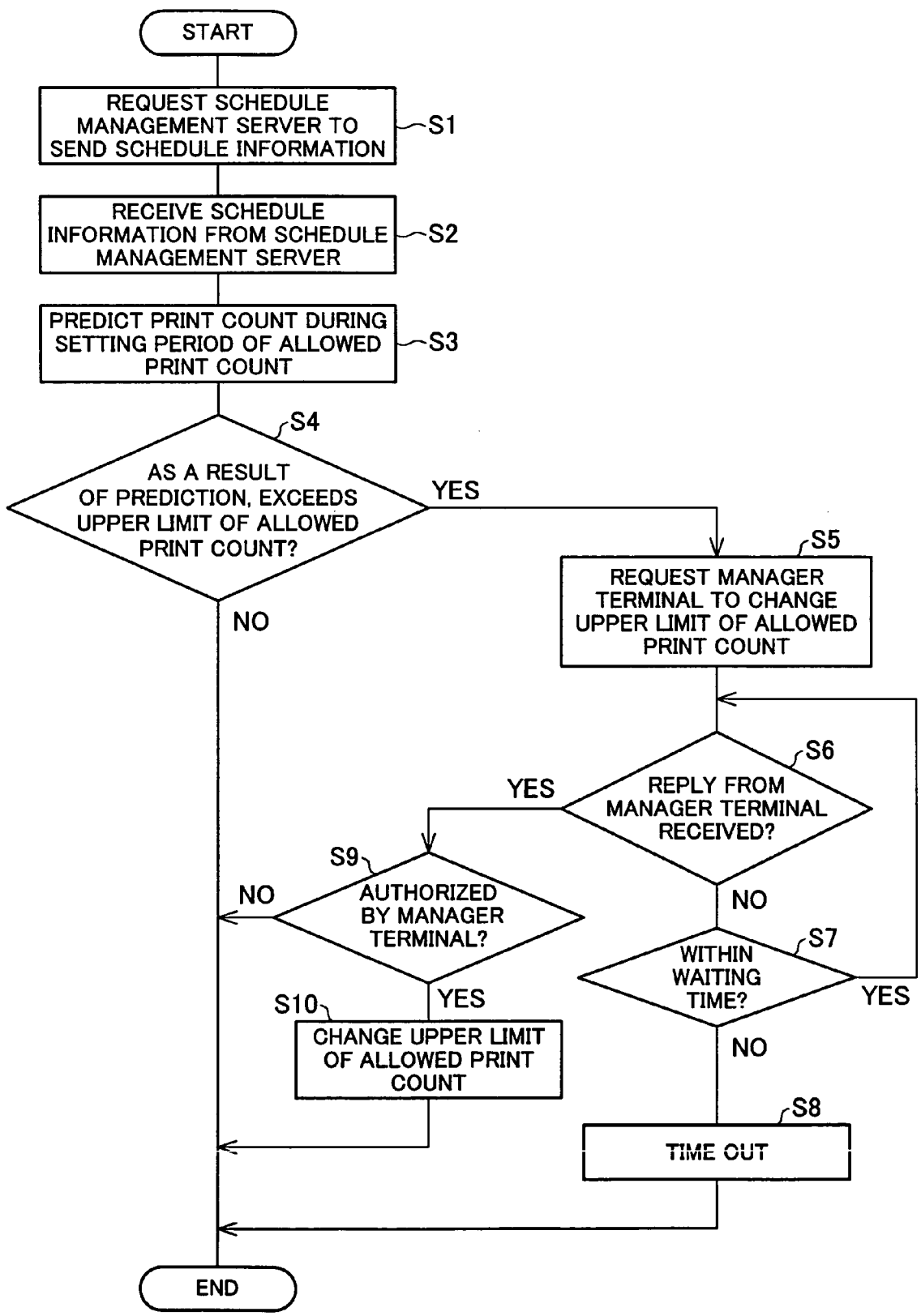
FIG. 7 is a flowchart illustrating an exemplary process in which the multi function printer according to one embodiment of the present invention requests a manager terminal to authorize change of an upper limit of allowed print count.

Referring to FIG. 7, the following will describe a process in which the multi function printer 4 requests the manager terminal 3 to authorize change of the upper limit of allowed print count of a user. Note that, FIG. 7 is a flowchart of an exemplary process in which the multi function printer 4 requests the manager terminal 3 to authorize change of the upper limit of allowed print count.

First, in the multi function printer 4, when a predetermined time comes, in response to notification from the clocking section 13, the print count predicting section 21 instructs the schedule transmission requesting section 20 to obtain schedule information from the schedule management server 5. In response to an instruction from the print count predicting section 21, the schedule transmission requesting section 20 requests, through the printer communications section 10, the schedule management server 5 to transmit schedule information of a user (Step S1, hereinafter "step" will be abbreviated to "S").

Note that, the multi function printer 4 according to the present embodiment, as described above, is set so as to obtain user's schedule information from the schedule management server 5 at predetermined time intervals. The predetermined time intervals are managed by the clocking section 13.

The predetermined time intervals may be constant. Alternatively, the clocking section 13 may set so that the predetermined time intervals may be shorter as time gets closer to the last day of a time period during which a print count is allocated to a user.

For example, on the assumption that an upper limit of allowed print count is set to a user during a time period from the first day to the last day of April, it is predicted that there is a lower possibility that the number of print sheets used by a user reaches the upper limit of allowed print count in the first half of April, whereas there is a higher possibility that the number of print sheets used by a user reaches the upper limit of allowed print count as the time period gets closer to the last day of April.

In view of this, the clocking section 13 may be set so that in the first half of April schedule information is obtained on a week basis, whereas in the last half of April schedule information is obtained at shorter time intervals as the time period gets closer to the last day of April.

Schedule information requested from the schedule transmission requesting section 20 to the schedule management server 5 is schedule information of all users whose upper limits of allowed print counts are managed. Therefore, if there exist a plurality of users, plural sets of schedule information are obtained.

Further, in requesting the schedule management server 5 to send schedule information, the schedule transmission requesting section 20 sends together with account information of a user relating to schedule information transmission of which is requested, to the schedule management server 5.

In response to the schedule information transmission request made by the schedule transmission requesting section 20, the schedule management server 5 selects schedule information of a user from the schedule file 42, in accordance with the received account information. Then, the schedule management server 5 sends the selected schedule information to the multi function printer 4.

It should be noted that if all sets of schedule information managed by the schedule management server 5 always match all sets of schedule information transmissions of which are requested by the multi function printer 4, the multi function printer 4 need not send account information of users to the schedule management server 5. That is, in this case, when the user terminal 2 requests the schedule management server 5 to send schedule information, the schedule management server 5 transmits, to the user terminal 2, all sets of schedule information in its own schedule file 42.

Further, the schedule management server 5 sends, to the multi function printer 4, schedule information for a setting period of an upper limit of allowed print count. FIG. 5 illustrates the content of schedule information for each purpose of printing. Here, in sending schedule information from the schedule management server 5 to the multi function printer 4, any sets of schedule information concerning unprocessed print jobs are sent among individual sets of schedule information in a setting period of allowed print count.

More specifically, for example, in a case where an upper limit of allowed print count for a user A is set on monthly basis, and print jobs on and before October 9 are completed as shown in FIG. 8, the schedule management server 5 sends schedule information of the user A for a time period from October 10 to October 31. FIG. 8 illustrates an exemplary schedule information transmitted from the schedule management server 5 to the multi function printer 4. In FIG. 8, boxes corresponding October 1 through October 9 are diagonally shaded for indication of already-completed print jobs.

Upon receipt of schedule information from the schedule management server 5 (S2), the schedule transmission requesting section 20 of the multi function printer 4 passes the received schedule information to the print count predicting section 21.

The print count predicting section 21 predicts, on the basis of the schedule information received via the schedule transmission requesting section 20 and the print conditions 27 stored in the printer storing section 15, whether there will occur an excess over an upper limit of allowed print count of the user during a setting period of the allowed print count (S3).

That is, from the received schedule information, the print count predicting section 21 can know a print count required for future scheduled print jobs for the user (scheduled print count). In addition, the print count predicting section 21 checks the print conditions 27 to compare between the number of already used print sheets and an upper limit of allowed print count allocated to the user, so that it can know a remaining allowed print count.

The print count predicting section 21 determines whether the remaining allowed print count is larger or smaller than the scheduled print count (S4). It should be noted that this determination, if an upper limit of allowed print count is assigned to a group of plural users, is made with respect to respective upper limits of allowed print counts assigned to the users.

As a result of the determination by the print count predicting section 21, if the remaining allowed print count is larger than the scheduled print count, it is predicted that there will occur no excess over the upper limit of allowed print count during a setting period of the allowed print count. On the other hand, if the remaining allowed print count is lower than the scheduled print count, it is predicted that there will occur an excess over the upper limit of allowed print count during a setting period of the allowed print count.

If it is predicted that there will occur an excess over the upper limit of allowed print count during a setting period of the allowed print count ("YES" in S4), the print count predicting section 21 instructs the print restriction changing section 23 to request the manager terminal 3 to authorize change of an upper limit of allowed print count allocated to a user who is expected to exceed the upper limit of his/her allowed print count.

In response to the instruction given from the print count predicting section 21, the settings change inquiry section 22 requests, via the printer communications section 10, the manager terminal 3 to authorize change of an upper limit of allowed print count allocated to the user concerned (S5). Further, in making the above request, the settings change inquiry section 22 also sends the schedule information, obtained by the schedule transmission requesting section 20, and a determination result to the manager terminal 3.

It should be noted that the determination result refers to result information obtained in the determination made by the print count predicting section 21, for example, information indicating that it is predicted there will occur an excess over the upper limit of allowed print count by how many print count.

Meanwhile, upon receipt of the request made from the multi function printer 4, the manager terminal 3 decides whether this request will be authorized, and then makes a reply to the multi function printer 4.

In the multi function printer 4, if the settings change inquiry section 22 receives a reply from the manager terminal 3 ("YES" in S6), the settings change inquiry section 22 analyzes the reply received from the manager terminal 3 and then checks whether change of the upper limit of allowed print count has been authorized (S9).

On the other hand, in the multi function printer 4, if the settings change inquiry section 22 does not receive a reply from the manager terminal 3 ("NO" in S6), the settings change inquiry section 22 determines whether the multi function printer 4 is now in a waiting time preset for this reply (S7). If the multi function printer 4 is now in the waiting time ("YES" in S7), the settings change inquiry section 22 repeatedly determines whether the settings change inquiry section 22 has received a reply from the manager terminal 3. If no reply has been received from the manager terminal 3 in the waiting time ("NO" in S7), the process is ended.

That is, the multi function printer 4 according to the present embodiment presets a response time for responding to a request for authorizing change of the upper limit of allowed print count, made to the manager terminal 3. The multi function printer 4 is arranged so as not to change allowed print count if it has not received a reply from the manager terminal 3 within this response time. It should be noted that this response time is set suitably according to a timing of a reply from the manager terminal 3.

If the manager terminal 3 authorizes changing an upper limit of allowed print count ("YES" in S9), the settings change inquiry section 22 checks that an upper limit of allowed print count of which user has been changed to what print count value, and sends (i) an allowed print count change instruction and (ii) what print count value the upper limit of allowed print count will be changed to, to the print restriction changing section 23.

The print restriction changing section 23, in response to the change instruction given from the settings change inquiry section 22, changes contents of the print conditions 27 (S10). That is, the print restriction changing section 23 rewrites a new upper limit of allowed print count of the user who has been authorized changing his/her upper limit of allowed print count.

Further, the print restriction changing section 23 instructs the processing result notifying section 24 to present information on the new upper limit of allowed print count to the user whose upper limit of allowed print count has been changed. In response to the instruction from the print restriction changing section 23, the settings change inquiry section 22 notifies the information on the new upper limit of allowed print count to the user terminal 2 used by the user whose upper limit of allowed print count has been changed.

(Process Flow of Manager Terminal)

The following will describe how the manager terminal 3 processes a received request for authorizing changing an upper limit of allowed print count in the multi function printer 4.

Figure 9:
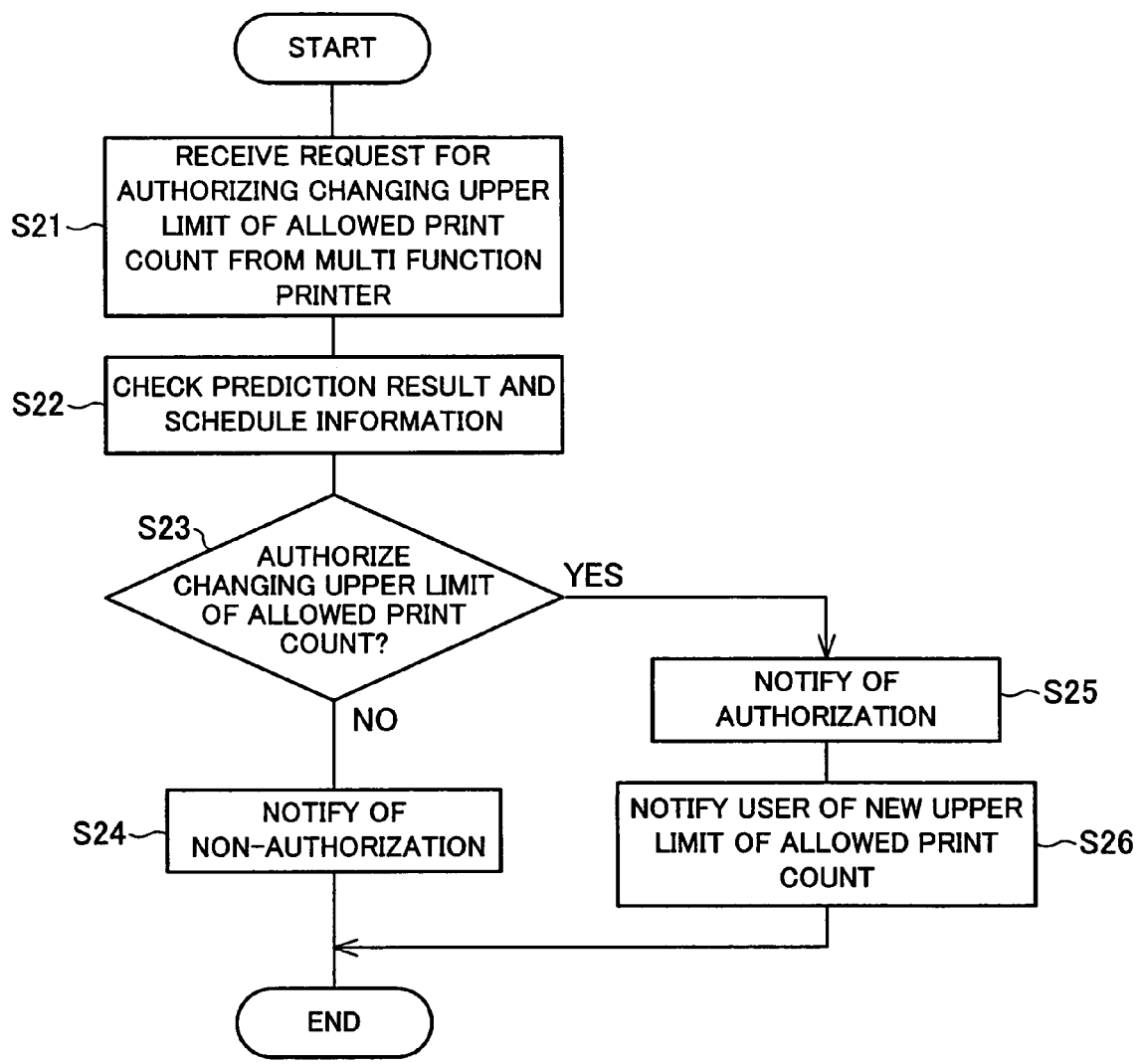
FIG. 9 is a flowchart illustrating an example of how the manager terminal according to one embodiment of the present invention processes a request for authorizing change of an upper limit of allowed print count, made from the multi function printer.

FIG. 9 is a flowchart illustrating an example of how the manager terminal 3 according to the present embodiment processes the request for authorizing changing an upper limit of allowed print count, made from a multi function printer.

First, when the manager terminal 3 receives the request for authorizing changing an upper limit of allowed print count from the multi function printer 4 (S21), it checks schedule information transmitted from the multi function printer 4 and information on a result of prediction performed by the multi function printer 4 (S22).

That is, the manager terminal 3 displays, on the display section such as a display device, schedule information of a user whose upper limit of allowed print count is requested to be changed. In addition, the manager terminal 3 displays the information on a result of prediction performed by the multi function printer 4.

With reference to the displayed schedule information and information on a result of prediction, a manager judges a necessity for changing an upper limit of allowed print count. Then, the manager enters a result of judgment whether he/she authorizes the request made from the multi function printer 4, using the input section provided to the manager terminal 3 (S23).

If the manager enters a result of the judgment that he/she authorizes the request ("YES" in S23), the manager terminal 3 notifies authorization for the request and a new upper limit of allowed print count to the multi function printer 4. In addition, the manager terminal 3 changes an upper limit of allowed print count of the user concerned, which the manager terminal 3 holds.

On the other hand, the manager enters, through the input section, a result of the judgment that he/she does not authorize the request received from the multi function printer 4 ("NO" in S23), the manager terminal 3 notifies to the multi function printer 4 that the request is unauthorized.

According to the above description, on occasions where the multi function printer 4 makes a request for changing an upper limit of allowed print count and the manager terminal 3 authorizes to change the upper limit of allowed print count, the multi function printer 4 is arranged so as to notify a new upper limit of allowed print count to the user terminal 2 used by the user who has been authorized to change the upper limit of allowed print count.

Figure 10:
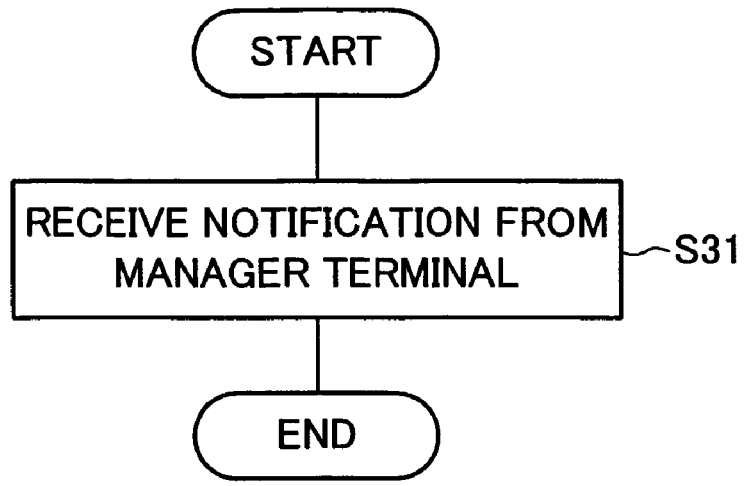
FIG. 10 is a flowchart illustrating an example of how the user terminal according to one embodiment of the present invention processes when the multi function printer makes a request for changing an upper limit of allowed print count.

Therefore, when the multi function printer 4 makes a request for changing an upper limit of allowed print count, as shown in FIG. 10, the user terminal 2 receives notification of a new upper limit of allowed print count (S31). FIG. 10 is a flowchart illustrating how the user terminal 2 according to the present embodiment processes when the multi function printer 4 makes a request for changing an upper limit of allowed print count.

That is, the user terminal 2 is allowed to receive a new upper limit of allowed print count from the multi function printer 4, so that a user operating the user terminal 2 can check his/her own new upper limit of allowed print count.

Figure 11:
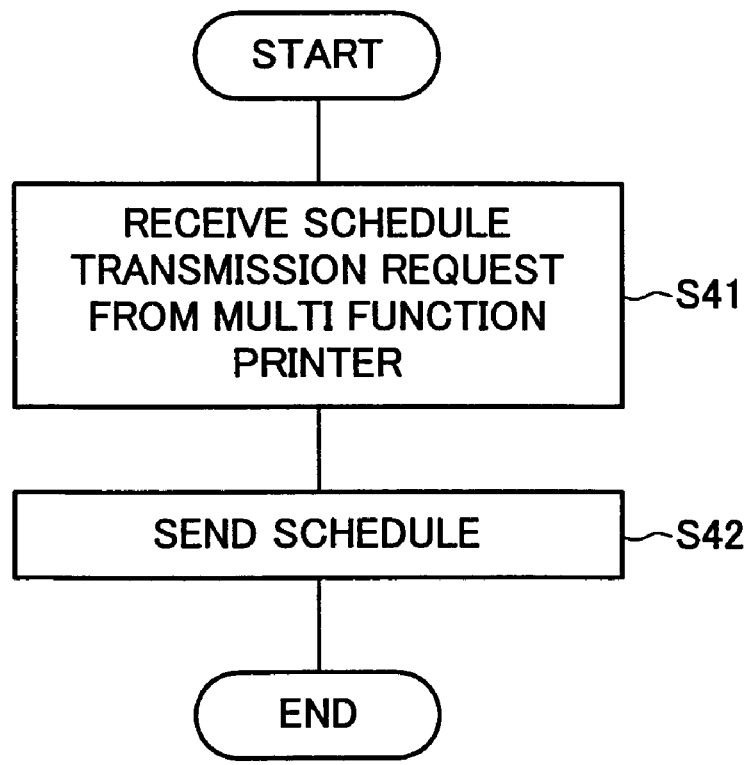
FIG. 11 is a flowchart illustrating an example of how the user terminal according to one embodiment of the present invention processes when the multi function printer makes a request for changing an upper limit of allowed print count.

Meanwhile, when the multi function printer 4 makes a request for changing an upper limit of allowed print count, the schedule management server 5 performs, as shown in FIG. 11, the following process.

First, the multi function printer 4, in response to a notification from the clocking section 13 that a predetermined time period has elapsed, predicts whether future print jobs will cause an excess over an upper limit of allowed print count allocated to users. In order to perform this prediction, the multi function printer 4 requests the schedule management server 5 to send respective sets of schedule information of the users.

That is, the schedule management server 5 receives a request for transmitting schedules of the users from the multi function printer 4 (S51). It should be noted that in receiving this request, the schedule management server 5 also receives account information of the users via the management unit communications section 34.

Then, in the schedule management server 5, the management section 40 refers to account information of the users, selects corresponding sets of schedule information from the schedule file 42, and transmits them to the multi function printer 4 that has requested the transmission of schedules (S42).

It should be noted that when a user has processed a print job, the schedule management server 5 is arranged so as to receive, from the multi function printer 4, (i) information on the number of printed sheets used during the print job processed by this user and (ii) information on purpose of the print job. The schedule management server 5, when a certain user has processed a print job, records the number of printed sheets used during the print job into schedule information corresponding to the information on purpose of this print job.

Thus, the schedule management server 5 records a schedule of an actually performed print job and the number of printed sheets used during this print job, so that it is possible to check a difference between a print count for a scheduled print job in schedule information and the number of printed sheets used during an actually performed print job.

When the user processes a print job that is not a scheduled print job in schedule information, the schedule management server 5 records the number of printed sheets used during this print job as the number of printed sheets used during an unscheduled print job in schedule information. Thus, the schedule management server 5 can keep a history of the number of printed sheets used during an unscheduled print job that is not included in schedule information. Note that, the print management system 1 prompts the user to enter a purpose of this unscheduled print job, thus enabling to check a content of the unscheduled print job.

Whether a print job is an unscheduled print job is determined when the user obtains his/her own schedule information from the schedule management server 5 and selects a schedule corresponding to a purpose of a print job to be actually performed from the obtained schedule information, prior to processing of the print job.

In this case, the user notifies a selected schedule to the multi function printer 4 to instruct processing a print job. After completion of the print job, the schedule management server 5 receives, from the multi function printer 4, the number of printed sheets used during the print job and information of a schedule corresponding the print job completed.

Further, the schedule management server 5 may select information of a schedule corresponding to a time when the print job has been performed, so as to bring the number of printed sheets used during the print job into correspondence with the selected schedule.

Note that, in either case, in receiving an instruction to perform an unscheduled print job that is not in schedule information, the multi function printer 4 is notified of (i) an unscheduled print job that is not in schedule information and (ii) a purpose of the unscheduled print job. After completion of the print job, the schedule management server 5 receives, from the multi function printer 4, (a) the number of printed sheets used during this print job and (b) a notification that this print job is an unscheduled print job that is not in schedule information.

Thus, the multi function printer 4 according to the present embodiment can make the manager terminal 3 in advance to change allowed print count allocated to a user who is expected to exceed an upper limit of allowed print count in the future.

Therefore, in the multi function printer 4 of the print management system 1 according to the present embodiment, it is possible to change, in advance, an upper limit of allowed print count allocated to each user if necessary. In the print management system 1 according to the present embodiment, this eliminates the need for the user making a request for authorizing change of the upper limit of allowed print count to the manager every time a print count reaches its upper limit.

Further, in the multi function printer 4 of the print management system 1, it is possible to change an upper limit of allowed print count allocated to a user in advance, if necessary. Therefore, the print management system 1 according to the present embodiment can avoid the problem that after the request for authorizing changing an upper limit of allowed print count has been made to the manger terminal 3, a reply to the request of a user cannot be quickly obtained from the manager terminal 3 because of the absence of a manager operating the manager terminal 3.

That is, the multi function printer 4 of the print management system 1 can avoid the problem that a user who has already reached an upper limit of allowed print count cannot promptly perform a urgent print job since the user cannot obtain an authorization to change the upper limit of allowed print count from the manager terminal 3.

Therefore, the multi function printer 4 of the print management system 1 according to the present embodiment can reduce print job costs by setting print job restrictions (print restrictions) and smoothly process print jobs by appropriately changing the upper limit in advance if necessary.

The above description has been given based on the multi function printer 4 which requests the manager terminal 3 to change an upper limit of allowed print count if necessary, and changes the upper limit of allowed print count if having obtained authorization to this request from the manager terminal 3.

Further, the multi function printer 4 may be arranged so that instead of changing the upper limit, it can change allowed print count allocated to a user, to a separate allowed print count. The separate allowed print count refers to allowed print count that is provided separately from the allowed print count allocated to a user.

That is, the print management system 1 according to the present embodiment has the separate allowed print count that is provided separately from the allowed print count allocated to each user. As to the restrictions on the number of processable print sheets, if change from the allowed print count allocated to a user to the separate allowed print count has been made, the number of sheets used in the print job performed after this change is counted in a range of the separate allowed print count.

Note that, the separate allowed print count has no upper limit of allowed print count. In addition, the separate allowed print count is allocated to share it among a plurality of users, rather than provided for each user. Therefore, after change is made from the allowed print count allocated to each user to the separate allowed print count, the number of printed sheets used in a print job is counted in a range of the separate allowed print count.

Figure 12:
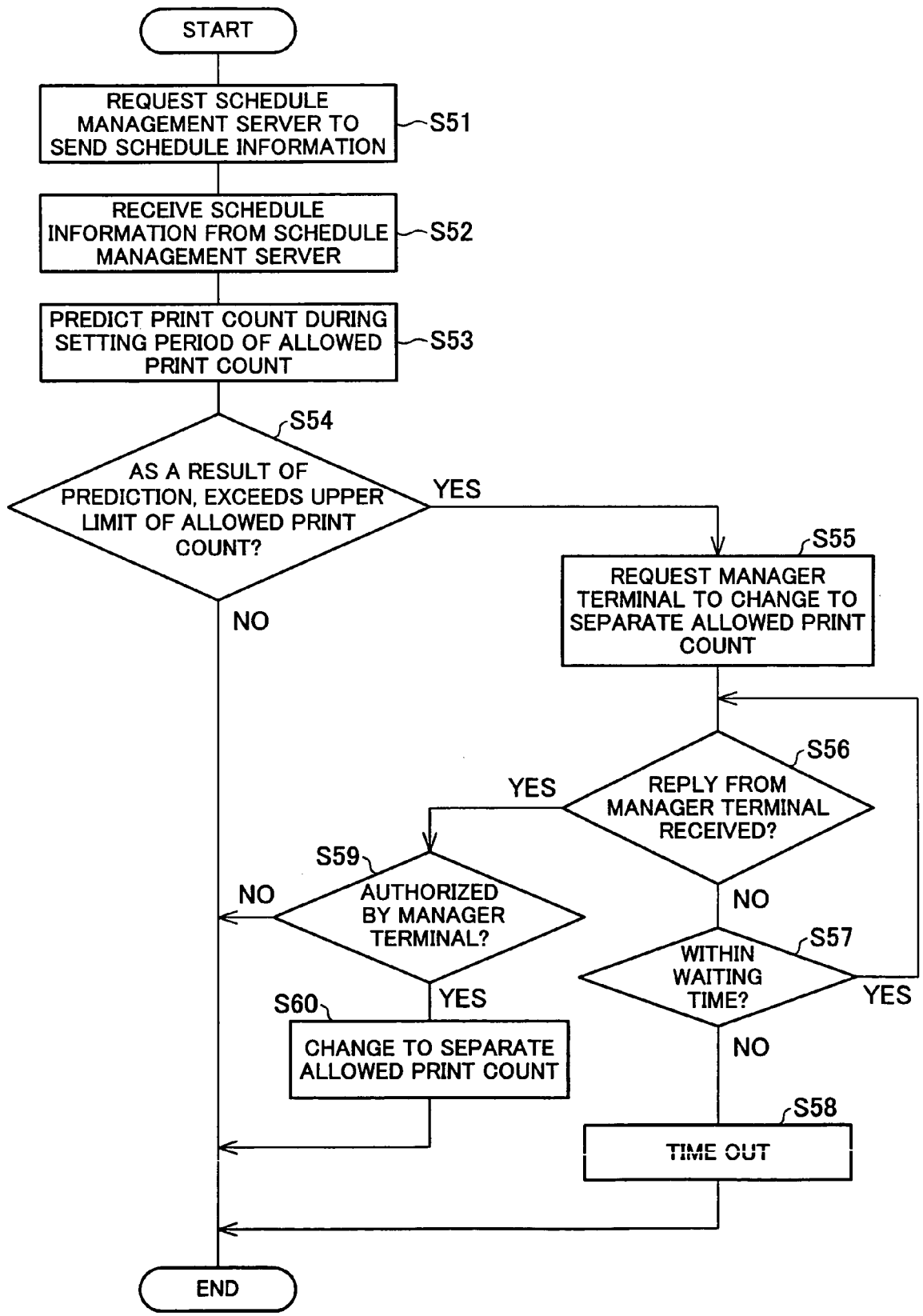
FIG. 12 is a flowchart illustrating an exemplary process of requesting the manager terminal to authorize change to a separate allowed print count in the multi function printer according to one embodiment of the present invention.

In the following description, a request for authorizing change to the separate allowed print count is made. Referring to FIG. 12, the following will describe how the multi function printer 4 processes to change from the allowed print count allocated to each user to the separate allowed print count, regarding the restrictions on the number of processable print sheets. FIG. 12 is a flowchart illustrating an exemplary process of requesting the manager terminal 3 to authorize change to the separate allowed print count in the multi function printer 4 according to the present embodiment.

Note that, in FIG. 12, a process in which the multi function printer 4 predicts whether the number of print sheets used in a future print job will cause an excess over the upper limit of the allowed print count allocated to each user (process from S51 to S54) is the same as the process from S1 to S4 of FIG. 7. Therefore, explanation of the process from S51 to S54 will be omitted.

In S54, if it is predicted that future print jobs will cause an excess over an upper limit of allowed print count of a user within a setting period of the allowed print count ("YES" in S54), the settings change inquiry section 22 of the multi function printer 4 requests the manager terminal 3 to authorize changing the allowed print count allocated to the user to the separate allowed print count (S55).

In response to this request, the manager terminal 3 determines whether it will authorize change to the separate allowed print count, and then sends a reply to the multi function printer 4.

Here, the process in which the multi function printer 4 checks whether it has received a reply from the manager terminal 3 within a preset waiting time (S56 to S58) is the same as the process from S6 to S8 of FIG. 7. Therefore, explanation thereof will be omitted.

If the multi function printer 4 receives a reply to the request from the manager terminal 3, and the reply is indicative of authorization of change to the separate allowed print count ("YES" in S59), the multi function printer 4 changes the allowed print count allocated to the user to the separate allowed print count (S60).

Note that, in the above description, the separate allowed print count is set so that unlimited number of processable print sheets can be used. However, the present invention is not limited to this. The upper limit of the separate allowed print count may be determined so as to stay within a partial print job budget that is allowed to be allocated to the separate allowed print count.

Further, in the above description, the separate allowed print count is provided in advance so as to be used by a plurality of users. However, the separate allowed print count may be set for each user, as additional allowed print count, separately from the allowed print count allocated to each user.

As described above, the multi function printer 4 of the print management system 1 according to the present embodiment can change the allowed print count allocated to the user to the separate allowed print count, if necessary. Thus, the multi function printer 4 according to the present embodiment can prevent the trouble that every time a user whose allowed print count has reached its upper limit needs to perform a print job, the user must request a manager to change the upper limit of the allowed print count.

It should be noted that the components and the process steps in the multi function printer 4 of the foregoing embodiment are realized by a CPU or other computing section executing a program stored in a ROM (Read Only Memory), RAM, or other storage device to control an input section such as keyboard and touch panel, an output section such as display, or communications section such as interface circuit. Therefore, a computer having these components can realize various functions and various processes in the multi function printer 4 of the present embodiment only by reading a storage medium storing the program and executing the program. Further, storage of the program into a removable storage medium realizes implementation of the same functions and processes on any computer.

The storage medium may be a memory (not shown) for process steps on a microcomputer. For example, the program medium may be something like a ROM. Alternatively, the program medium may be such that a program reader device (not shown) as an external storage device may be provided in which a storage medium is inserted for reading.

In addition, in any case, the stored program is preferably executable on access by a microprocessor. Further, it is preferred if the program is retrieved, and the retrieved program is downloaded to a program storage area in a microcomputer to execute the program. The download program is stored in a main body device in advance.

In addition, the program medium may be a storage medium constructed separably from a main body. The medium may be tape based, such as a magnetic tape or cassette tape; disks, such as a flexible disc or hard disk including a magnetic disc and CD/MO/MD/DVD; cards, such as an IC card (including a memory card); or a semiconductor memory, such as a mask ROM, EPROM (Erasable Programmable Read Only Memory), EEPROM (Electrically Erasable Programmable Read Only Memory), and a flash ROM. All these types of media hold the program in a fixed manner.

In contrast, the system is arranged to connect to the communications network 6 including the Internet, so that the medium is preferably a storage medium which holds the program in a flowing manner so that the program can be downloaded over the communications network 6.

Further, if the program is downloaded over the communications network 6 in this manner, it is preferred if the download program is either stored in a main body device in advance or installed from another storage medium.

Further, the print management system 1 according to the present embodiment may be arranged such that under the circumstances where it is provided with a plurality of manager terminals 3, priorities are assigned to the manager terminals 3 so that the multi function printer 4 can make a request for changing an upper limit of print count allocated to a user, first to the manager terminal 3 with a higher priority.

Still further, the foregoing print management system 1 may be arranged such that if a manager of the manager terminal 3 to which the multi function printer 4 makes the request is absent, the same request from the multi function printer 4 is transferred to another manager terminal 3 automatically by priorities.

Alternatively, the foregoing print management system 1 may be arranged such that if a manager of the manager terminal 3 to which the multi function printer 4 makes the request is absent, the same request is automatically transferred to a portable terminal device that the manager owns so that the manager makes a reply indicative of approval or disapproval to the multi function printer 4, using the portable terminal device.

Further, the foregoing print management system 1 may be arranged such that the multi function printer 4 determines whether to make the request to the manager terminal 3 after obtaining a schedule of a manager of the manager terminal 3 from the schedule management server 5 to check whether the manager is present. Alternatively, the foregoing print management system 1 may be arranged such that under the circumstances where it is provided with a plurality of manager terminals 3, the multi function printer 4 obtains all schedules of managers operating the manager terminals 3 so that the multi function printer 4 can transmit the request to the manager terminal 3 a manager of which is present.

In the foregoing print management system 1, the multi function printer 4 predicts whether changing an upper limit of allowed print count is required. Alternatively, the multi function printer 4 predicts whether as to settings for the restrictions on the number of processable print sheets, change of allowed print count to the separate allowed print count is required. If predicting that this change is required, the multi function printer 4 requests the manager terminal 3 to authorize the foregoing change.

In addition, in the above description, if the manager terminal 3 approves the request for authorizing the change, the multi function printer 4 changes an upper limit of allowed print count allocated to each user, or changes the allowed print count to the separate allowed print count.

However, the foregoing print management system 1 is not limited to this arrangement. For example, the manager terminal 3 may predict whether change of the upper limit of allowed print count or change to the separate allowed print count is required. Alternatively, this prediction may be performed by the schedule management server 5.

For example, in a case where the manager terminal 3 predicts whether change of an upper limit of allowed print count or change to the separate allowed print count is required or not, the manager terminal 3 includes the schedule transmission requesting section 20, the print count predicting section 21, the settings change inquiry section 22, and the print restriction changing section 23 of the multi function printer 4. It should be noted that the settings change inquiry section 22 instructs the output section of the manager terminal 3, such as a display device, to inquire the manager about whether he/she will approve the authorization of the foregoing change. A reply of the manager to this inquiry is entered by the manager through the input section such as a keyboard, and the entered reply information is checked by the settings change inquiry section 22.

In a case where the prediction is performed by the schedule management server 5, the schedule management server 5 includes the schedule transmission requesting section 20, the print count predicting section 21, the settings change inquiry section 22, and the print restriction changing section 23 of the multi function printer 4, as in the above arrangement. In this case, it should be noted that the schedule transmission requesting section 20 instructs the management section 40 to obtain schedule information of each user from the schedule file 42 so that the print count predicting section 21 judges whether the foregoing change is required. Then, the schedule management server 5 inquires the manager terminal 3 about whether the manager terminal 3 will approve the authorization of the foregoing change. If the schedule management server 5 obtains approval for the authorization of the change from the manager terminal 3, change of allowed print count set to each user is performed.

Further, the manager terminal 3 or the multi function printer 4 may include the schedule management server 5.

Note that, in the print management system 1, a print information recording device can be realized by the schedule management server 5.

Further, in a case where the multi function printer 4 changes an upper limit of allowed print count allocated to each user or changes the allowed print count to the separate allowed print count, the settings change inquiry section 22, which is included in the multi function printer 4, and the output section (not shown) of the manager terminal 3, such as a display device, can realize a change authorization confirming section of the print restrictions management system. In this case, the change authorization confirming section is realized by the output section (not shown) of the manager terminal 3, such as a keyboard, and the settings change inquiry section 22.

On the other hand, in a case where the manager terminal 3 changes an upper limit of allowed print count allocated to each user, or changes the allowed print count to the separate allowed print count, the settings change inquiry section 22 and the output section (not shown) of the manager terminal 3, such as a display device, both of which are included in the manager terminal 3, can realize the change authorization confirming section. In this case, the change authorization confirming section is realized by the output section (not shown) of the manager terminal 3, such as a keyboard, and the settings change inquiry section 22 included in the manager terminal 3.

A printing apparatus according to the present invention is a printing apparatus in which print restrictions concerning print jobs are set for each user requesting the print jobs, said printing apparatus being communicably connected to a manager terminal used by a manager authorized to set the print restrictions, the printing apparatus comprising: (i) a print restrictions management information acquiring section for acquiring print restrictions management information indicative of correspondences between the print restrictions assigned to a user and information concerning print jobs of the user; (ii) a settings change predicting section for predicting whether changing the print restrictions set to the user is required, in accordance with the print restrictions management information acquired by the print restrictions management information acquiring section; and (iii) a change authorization confirming section for transmitting change authorization confirming information to the manager terminal if the settings change predicting section has predicted that changing the print restrictions is required, the change authorization confirming information being indicative of inquiry about whether the manager terminal authorizes changing the print restrictions, wherein said printing apparatus performs a print job with the print restrictions changed, if the change authorization confirming section has received print restrictions change authorization information from the manager terminal.

For example, the print restrictions are restrictions set for each user and concerning print jobs performed in the printing apparatus, including restrictions on the use of the printing apparatus by the user, i.e. whether the user is allowed to use the printing apparatus, and restrictions on print count assigned to the user.

The printing apparatus according to the present invention sets the foregoing print restrictions. For example, in a case where the print restrictions are restrictions on users who are allowed to use the printing apparatus, only authorized users are allowed to process print jobs. Alternatively, in a case where the print restrictions are restrictions on print count assigned to each user, the user is restricted to process unnecessary print jobs. Therefore, the printing apparatus according to the present invention allows for reduction in print job costs.

Further, the foregoing printing apparatus includes the print restrictions management information acquiring section, thus allowing to acquire print restrictions management information indicative of correspondences between the print restrictions and information concerning print jobs of the user.

Here, the information concerning print jobs of the user includes information obtained after the user processes a print job and information concerning the print restrictions, such as the number of printed copies already made by this user, the number of copies to be printed in the future, the number of times the user provided a print job instruction, and time when the user processed a print job.

Still further, the foregoing printing apparatus includes the settings change predicting section, thus allowing to predict the necessity for changing the print restrictions according to the print restrictions management information acquired by the print restrictions management information acquiring section. Thus, the printing apparatus can predict the necessity for changing the print restrictions set to the user, according to print job status of the user.

Yet further, the foregoing printing apparatus includes the change authorization confirming section, thus requesting the manager authorized to set the print restrictions to authorize changing the print restrictions if necessary, and changing the print restrictions if having obtained the authorization from the manager so as to perform a print job.

Here, the manager is authorized to set the print restrictions. In an analogy with corporate organization, the manager is equivalent of management staff.

Therefore, the printing apparatus according to the present invention can change the print restrictions in advance if necessary, according to print job status of the user, so as to process a print job. This prevents the trouble that the manager terminal receives a request for authorizing changing the print restrictions from the user who is not allowed to process a print job because of the print restrictions, every time the user needs to process a print job. Thus, it is possible to realize increase in efficiency of print jobs processing.

Therefore, the printing apparatus according to the present invention realizes reduction in print job costs by setting print job restrictions (print restrictions), and efficiently processing print jobs by appropriately changing the print restrictions in advance if necessary.

Further, the printing apparatus according to the present invention, in the foregoing arrangement, may be arranged such that the change authorization confirming section sends, to the manager terminal, (a) print restrictions management information acquired by the print restrictions management information acquiring section and (b) the change authorization confirming information being indicative of inquiry to the manager terminal about whether the manager terminal authorizes changing the print restrictions.

In sending the change authorization confirming information being indicative of inquiry about whether the manager terminal authorizes changing print restrictions information, the change authorization confirming section can send the print restrictions management information to the manager terminal. Therefore, a manager who operates the manager terminal can determine whether it authorizes changing the print restrictions with reference to the print restrictions management information.

Still further, the printing apparatus according to the present invention, in the foregoing arrangement, is preferably arranged such that the change authorization confirming section includes a response time setting section for setting a manager terminal's response time for the change authorization confirming information, wherein the response time setting section varies the response time.

The foregoing printing apparatus includes the response time setting section, thus allowing to set a manager's response time for the change authorization confirming information. The response time setting section varies the response time. Thus, the printing apparatus can appropriately set the response time according to a timing of a reply from the manager.

Yet further, the printing apparatus according to the present invention, in the foregoing arrangement, may be arranged such that the settings change predicting section predicts whether changing the print restrictions is required, at predetermined time intervals.

Therefore, the printing apparatus according to the present invention can predict whether changing the print restrictions is required, at predetermined time intervals, thus allowing for prediction according to print job status of the user. Note that the predetermined time intervals may be constant time intervals all the time. Alternatively, a period during which the print restrictions are set may include different time intervals respectively set in the first half and last half of the period.

Further, the printing apparatus according to the present invention, in the foregoing arrangement, is such that the print restrictions comprise a print quota assigned to the user in a predetermined time period, the information concerning print jobs of the user comprises history information of a quantity of printed copies made by the user in a print job, and the settings change predicting section determines whether a quantify of copies printed by the user in a predetermined time period exceeds the print quota, according to the history information, so as to predict whether change of the print quota is required.

The quantity of printed copies is, for example, a quantity processed in a print job, such as the number of printed sheets used in a print job. The print quota is, for example, the quantity of printed copies allocated to a user for print jobs, such as the number of printed sheets that the user is allowed to make for the print jobs.

The predetermined time period may be, for example, one year or one week, i.e. a suitable period for restriction of the quantity of printed copies or a suitable period to make a budget appropriated to the quantity of printed copies.

The information concerning print jobs of the user is history information of the quantity of printed copies made by the user in a print job. Therefore, on the basis of the history information at the time of prediction, the settings change predicting section can therefore predict a quantity of copies printed in the future in a period during which the print quota is set. That is, the settings change predicting section compares between a predicted quantity of printed copies and the print quota, so as to predict whether change of the print quota is required according to whether the predicted quantity of printed copies exceeds the print quota.

Still further, the printing apparatus according to the present invention, in the foregoing arrangement, may be arranged such that the print restrictions comprise a print quota assigned to the user, the information concerning print jobs of the user comprises (a) a quantity of printed copies made by the user and (b) a quantity of copies to be printed by the user in the future, and the settings change predicting section determines whether a quantify of copies printed by the user in a predetermined time period exceeds the print quota, according to the quantities (a) and (b), so as to predict whether change of the print quota is required.

The settings change predicting section can compare between the print quota and a sum of the quantities (a) and (b) or compares between a difference between the print quota and the quantity (a) and the quantity (b), so as to determine whether a quantify of copies printed by the user in a predetermined time period exceeds the print quota. Thus, the settings change predicting section can predict whether change of the print quota is required.

Yet further, the printing apparatus according to the present invention, in the foregoing arrangement, is preferably arranged such that if the settings change predicting section has predicted that change of the print quota is required, the change authorization confirming section inquires, to the manager terminal, whether the manager terminal authorizes changing an upper limit of the print quota.

The foregoing printing apparatus, if the settings change predicting section has determined that change of the print quota is required, can inquire to the manager terminal whether the manager terminal authorizes changing an upper limit of the print quota.

Therefore, if the manager authorizes changing the print quota, the foregoing printing apparatus can change in advance the print quota assigned to the user.

This can prevent, for example, a trouble such in a case where the change of the print quota is change of an upper limit of the print quota, the user whose print quota reached its upper limit cannot be authorized to change the upper limit of the print quota due to manager's absence although a necessity for urgent print job processing arises.

Therefore, the printing apparatus according to the present invention can request the manager terminal in advance to authorize change of the print quota if necessary. The printing apparatus is not affected by a state of the manager terminal.

The printing apparatus according to the present invention, in the foregoing arrangement, may be arranged such that the print restrictions comprise (a) a print quota assigned to the user in a predetermined time period and (b) a separate print quota concerning print quota assigned to the user on special occasions, and the change authorization confirming section sends, to the manager terminal, the change authorization confirming information being indicative of inquiry about whether the manger terminal authorizes changing the assigned print quota of the user to the separate print quota.

Here, the special occasions includes occasions when unexpected print jobs must be processed, such as an occasion when it is certain that unscheduled urgent print jobs must be serially processed in the future, but they will obviously cause an excess over the upper limit of the print quota assigned to the user.

The separate print quota is, for example, an alternative print quota prepared to replace the assigned print quota to the user, or print quota prepared for use by a plurality of users, for the use on occasions when unexpected print jobs occur.

Further, the separate print quota, apart from the print quota assigned in advance to a user, is a print quota used by the user. This separate print quota may be a predetermined print quota or an unlimited print quota.

The foregoing printing apparatus, if the settings change predicting section has determined that change of the print quota is required, can inquire the manager terminal of whether the manager terminal authorizes change the assigned print quota of the user to the separate print quota.

Thus, the printing apparatus can change the assigned print quota of the user to the separate print quota. This allows print jobs to be smoothly processed on occasions when unexpected print jobs occur, but they will cause an excess over the print quota, without the necessity for requesting the manager to change of an upper limit of the print quota every time reaching the upper limit of the print quota occurs.

Further, a print restrictions management system according to the present invention, in order to solve the above problems, is a print restrictions management system in which print restrictions concerning print jobs are set for each user requesting the print jobs, and a manager terminal used by a manager authorized to set the print restrictions is communicably connected to a printing apparatus performing print jobs, the print restrictions management system comprising: (i) a print restrictions management information storage device for storing print restrictions management information indicative of correspondences between the print restrictions assigned to a user and information concerning print jobs of the user; (ii) a print restrictions management information acquiring section for acquiring the print restrictions management information from the print restrictions management information storage device; (iii) a settings change predicting section for predicting whether changing the print restrictions set to the user is required, in accordance with the print restrictions management information acquired by the print restrictions management information acquiring section; and (iv) a change authorization confirming section for outputting change authorization confirming information to the manager terminal if the settings change predicting section has predicted that changing the print restrictions is required, and confirming change authorization information supplied from the manager terminal, the change authorization confirming information being indicative of inquiry about whether the manager terminal authorizes changing the print restrictions, the change authorization information being indicative of whether the manager terminal authorizes changing the print restrictions, wherein the printing apparatus performs a print job with the print restrictions changed, if the change authorization confirming section has confirmed that the supplied change authorization information is indicative of authorization of changing the print restrictions.

Thus, the print restrictions management system according to the present invention can reduce print job costs by setting print job restrictions (print restrictions), and smoothly process print jobs by appropriately changing the print restrictions in advance if necessary.

Note that, the sections of the foregoing printing apparatus or the print restrictions management system may be realized by a computer. In this arrangement, the present invention includes a computer-readable storage medium storing a printing apparatus control program which realizes the foregoing printing apparatus on a computer by operating the computer as the above sections.

INDUSTRIAL APPLICABILITY

In the situation where print restrictions concerning print jobs are set for each user requesting the print jobs, the printing apparatus according to the present invention includes the change authorization confirming section for confirming the manager whether the manager authorizes changing the print restrictions on the basis of print job usage status of the user, wherein if the change authorization confirming section has confirmed to have obtained the authorization of changing the print restrictions from the manager, the printing apparatus performs a print job in accordance with the changed print restrictions. Thus, the foregoing printing apparatus can appropriately change the print restrictions dynamically according to usage status of the user.

Specific embodiments or examples implemented in the description of the embodiments only show technical features of the present invention and are not intended to limit the scope of the invention. Variations can be effected within the spirit of the present invention and the scope of the following claims.

What is claimed is:

1. A printing apparatus in which print restrictions concerning print jobs are set for each user requesting the print jobs, said printing apparatus being communicably connected to a manager terminal used by a manager authorized to set the print restrictions, the printing apparatus comprising:
  (i) a print restrictions management information acquiring section for acquiring print restrictions management information indicative of correspondences between the print restrictions assigned to a user and information concerning print jobs of the user;
  (ii) a settings change predicting section for predicting at regular time intervals whether changing the print restrictions set to the user is required by acquiring, to confirm a printing amount required in a future print job, a future print job schedule of the user from the print restrictions management information acquired by the print restrictions management information acquiring section; and
  (iii) a change authorization confirming section for transmitting change authorization confirming information to the manager terminal if the settings change predicting section has predicted that changing the print restrictions is required, the change authorization confirming information being indicative of inquiry about whether the manager terminal authorizes changing the print restrictions.

2. The printing apparatus as set forth in claim 1, wherein said printing apparatus performs a print job with the print restrictions changed, if the change authorization confirming section has received print restrictions change authorization information from the manager terminal.

3. The printing apparatus as set forth in claim 1, wherein the change authorization confirming section sends, to the manager terminal, (a) print restrictions management information acquired by the print restrictions management information acquiring section and (b) the change authorization confirming information being indicative of inquiry to the manager terminal about whether the manager terminal authorizes changing the print restrictions.

4. The printing apparatus as set forth in claim 1, wherein:
  the change authorization confirming section includes a response time setting section for setting a manager terminal's response time for responding to the change authorization confirming information, wherein the response time setting section varies the response time.

5. The printing apparatus as set forth in claim 1, wherein the print restrictions comprise a print quota assigned to the user in a predetermined time period, the information concerning print jobs of the user comprises history information of a quantity of printed copies made by the user in a print job, and the settings change predicting section determines whether a quantity of copies printed by the user in a predetermined time period exceeds the print quota, according to the history information, so as to predict whether change of the print quota is required.

6. The printing apparatus as set forth in claim 1, wherein the print restrictions comprise a print quota assigned to the user, the information concerning print jobs of the user comprises (a) a quantity of printed copies made by the user and (b) a quantity of copies to be printed by the user in the future, and the settings change predicting section determines whether a quantity of copies printed by the user in a predetermined time period exceeds the print quota, according to the quantities (a) and (b), so as to predict whether change of the print quota is required.

7. The printing apparatus as set forth in claim 5, wherein if the settings change predicting section has predicted that change of the print quota is required, the change authorization confirming section sends, to the manager terminal, the change authorization confirming information being indicative of inquiry about whether the manager terminal authorizes changing an upper limit of the print quota.

8. The printing apparatus as set forth in claim 6, wherein if the settings change predicting section has predicted that change of the print quota is required, the change authorization confirming section sends, to the manager terminal, the change authorization confirming information being indicative of inquiry about whether the manager terminal authorizes changing an upper limit of print quota.

9. The printing apparatus as set forth in claim 5, wherein the print restrictions comprise (a) a print quota assigned to the user in a predetermined time period and (b) a separate print quota concerning print quota assigned to the user on special occasions, and the change authorization confirming section sends, to the manager terminal, the change authorization confirming information being indicative of inquiry about whether the manger terminal authorizes changing the assigned print quota of the user to the separate print quota.

10. The printing apparatus as set forth in claim 6, wherein the print restrictions comprise (a) a print quota assigned to the user in a predetermined time period and (b) a separate print quota concerning print quota assigned to the user on special occasions, and the change authorization confirming section sends, to the manager terminal, the change authorization confirming information being indicative of inquiry about whether the manger terminal authorizes changing the assigned print quota of the user to the separate print quota.

11. A print restrictions management system in which print restrictions concerning print jobs are set for each user requesting the print jobs, and a manager terminal used by a manager authorized to set the print restrictions is communicably connected to a printing apparatus performing print jobs, the print restrictions management system comprising:

(i) a print restrictions management information storage device for storing print restrictions management information indicative of correspondences between the print restrictions assigned to a user and information concerning print jobs of the user;

(ii) a print restrictions management information acquiring section for acquiring the print restrictions management information from the print restrictions management information storage device;

(iii) a settings change predicting section for predicting at regular time intervals whether changing the print restrictions set to the user is required by acquiring, to confirm a printing amount required in a future print job, a future print job schedule of the user from the print restrictions management information acquired by the print restrictions management information acquiring section; and (iv) a change authorization confirming section for outputting change authorization confirming information to the manager terminal if the settings change predicting section has predicted that changing the print restrictions is required, and confirming change authorization information supplied from the manager terminal, the change authorization confirming information being indicative of inquiry about whether the manager terminal authorizes changing the print restrictions, the change authorization information being indicative of whether the manager terminal authorizes changing the print restrictions.

12. The print restrictions management system as set forth in claim 11, wherein the printing apparatus performs a print job with the print restrictions changed, if the change authorization confirming section has confirmed that the supplied change authorization information is indicative of authorization of changing the print restrictions.

13. A computer-readable storage medium storing a print control program for operating a printing apparatus, the program controlling a computer to function as:

(i) a print restrictions management information acquiring section for acquiring print restrictions management information indicative of correspondences between print restrictions concerning print jobs, set for each user requesting the print jobs, and information concerning print jobs of the user;

(ii) a settings change predicting section for predicting at regular time intervals whether changing the print restrictions set to the user is required by acquiring, to confirm a printing amount required in a future print job, a future print job schedule of the user from the print restrictions management information acquired by the print restrictions management information acquiring section; and (iii) a change authorization confirming section for transmitting change authorization confirming information to a manager terminal used by a manager authorized to set the print restrictions, if the settings change predicting section has predicted that changing the print restrictions is required, the change authorization confirming information being indicative of inquiry about whether the manager terminal authorizes changing the print restrictions; and (iv) a response time setting section for setting a manager terminal's response time for responding to the change authorization confirming information.

14. A computer-readable storage medium storing a print control program for operating a printing apparatus, the program controlling a computer to function as:

(i) a print restrictions management information acquiring section for acquiring print restrictions management information indicative of correspondences between print restrictions concerning print jobs, set for each user requesting the print jobs, and information concerning print jobs of the user, from a print restrictions management information storage device storing the print restrictions management information;

(ii) a settings change predicting section for predicting at regular time intervals whether changing the print restrictions set to the user is required by acquiring, to confirm a printing amount required in a future print job, a future print job schedule of the user from the print restrictions management information acquired by the print restrictions management information acquiring section; and (iii) a change authorization confirming section for outputting change authorization confirming information to a manager terminal used by a manager authorized to set the print restrictions, if the settings change predicting section has predicted that changing the print restrictions is required, and confirming change authorization information supplied from the manager terminal, the change authorization confirming information being indicative of inquiry about whether the manager terminal authorizes changing the print restrictions, the change authorization information being indicative of whether the manager terminal authorizes changing the print restrictions.

15. A method for controlling a printing apparatus being communicably connected to a manager terminal used by a manager authorized to set print restrictions concerning print jobs, the method comprising:

a step of acquiring print restrictions management information indicative of correspondences between the print restrictions assigned to a user and information concerning print jobs of the user;

a step of predicting at regular time intervals whether changing in the print restrictions set to the user is required by acquiring, to confirm a printing amount required in a future print job, a future print job schedule of the user from the print restrictions management information acquired; and a step of transmitting change authorization confirming information to the manager terminal if it has been predicted that changing the print restrictions is required, the change authorization confirming information being indicative of inquiry about whether the manager terminal authorizes changing the print restrictions.

* * * * *